United States Patent
Lee et al.

(10) Patent No.: US 10,057,877 B2
(45) Date of Patent: Aug. 21, 2018

(54) LOCATION ESTIMATION METHOD AND ELECTRONIC DEVICE FOR PERFORMING THE SAME

(71) Applicant: Samsung Electronics Co., Ltd., Gyeonggi-do (KR)

(72) Inventors: Seong Jae Lee, Suwon-si (KR); Jai Young Choi, Seoul (KR); Young Kyoo Kim, Seoul (KR); Jin Woo Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/424,676

(22) Filed: Feb. 3, 2017

(65) Prior Publication Data

US 2017/0223658 A1 Aug. 3, 2017

(30) Foreign Application Priority Data

Feb. 3, 2016 (KR) .................. 10-2016-0013343

(51) Int. Cl.
| | |
|---|---|
| H04W 24/00 | (2009.01) |
| H04W 64/00 | (2009.01) |
| H04W 4/02 | (2018.01) |

(52) U.S. Cl.
CPC .......... *H04W 64/006* (2013.01); *H04W 4/02* (2013.01); *H04W 24/00* (2013.01)

(58) Field of Classification Search
CPC ...... H04W 64/006; H04W 24/00; H04W 4/02
USPC .................... 455/456.1–456.6, 457
See application file for complete search history.

(56) References Cited

U.S. PATENT DOCUMENTS

| | | | |
|---|---|---|---|
| 7,236,882 B2 | 6/2007 | Karaoguz et al. | |
| 7,366,610 B2 | 4/2008 | Karaoguz et al. | |
| 7,610,149 B2 | 10/2009 | Karaoguz et al. | |
| 7,941,272 B2 | 5/2011 | Karaoguz et al. | |
| 8,108,145 B2 | 1/2012 | Karaoguz et al. | |
| 8,433,334 B2 | 4/2013 | Huang et al. | |
| 9,119,168 B2 | 8/2015 | Huang et al. | |
| 2006/0167628 A1 | 7/2006 | Karaoguz et al. | |
| 2007/0219713 A1 | 9/2007 | Karaoguz et al. | |
| 2007/0287473 A1* | 12/2007 | Dupray .................. | H04W 4/02 455/456.1 |
| 2008/0195311 A1 | 8/2008 | Karaoguz et al. | |
| 2009/0017837 A1* | 1/2009 | Kim, II .................. | G01S 5/10 455/456.1 |
| 2009/0281718 A1 | 11/2009 | Gibran et al. | |
| 2010/0106409 A1 | 4/2010 | Karaoguz et al. | |

(Continued)

FOREIGN PATENT DOCUMENTS

KR 20090063549 A 6/2009

*Primary Examiner* — Mong-Thuy Tran

(57) ABSTRACT

An electronic device includes a memory, a communication circuit, and a processor configured to operatively connect with the memory and the communication circuit. The processor is configured to send identification information of a base station attached to the electronic device via the communication circuit to a server, receive first base station information about base stations included in a first area on the base station from the server, store the first base station information in the memory, and estimate a location of the electronic device based on properties of a signal received from at least one of the base stations included in the first area or the first base station information.

13 Claims, 18 Drawing Sheets

| SERVING BASE STATION ID | NEIGHBORING BASE STATION ID | LATITUDE | LONGITUDE | STANDARD DEVIATION (LATITUDE) | STANDARD DEVIATION (LONGITUDE) | COVARIANCE (LATITUDE-LONGITUDE) |
|---|---|---|---|---|---|---|
| 15 | 45:345 | 37256062 | 1270200889 | 720 | 371 | 269181 |
| 15 | 345 | 37253042 | 1270200890 | 726 | 371 | 269140 |
| 345 | | 37256045 | 1270200891 | 1402 | 394 | 10494 |

(56) References Cited

U.S. PATENT DOCUMENTS

| | | | |
|---|---|---|---|
| 2010/0324813 A1* | 12/2010 | Sundararajan | G01C 21/20 701/532 |
| 2011/0176523 A1 | 7/2011 | Huang et al. | |
| 2011/0196609 A1 | 8/2011 | Karaoguz et al. | |
| 2012/0149415 A1* | 6/2012 | Valaee | H04W 64/00 455/507 |
| 2013/0084891 A1* | 4/2013 | Khorashadi | H04W 4/025 455/456.3 |
| 2013/0190006 A1* | 7/2013 | Kazmi | H04W 64/006 455/456.1 |
| 2013/0231132 A1 | 9/2013 | Huang et al. | |
| 2013/0324154 A1* | 12/2013 | Raghupathy | G01S 19/10 455/456.1 |
| 2015/0223027 A1* | 8/2015 | Ahn | G01S 5/0236 455/456.1 |
| 2016/0066151 A1* | 3/2016 | Palanki | H04L 67/10 455/456.1 |

* cited by examiner

| SERVING BASE STATION ID | NEIGHBORING BASE STATION ID | LATITUDE | LONGITUDE | STANDARD DEVIATION (LATITUDE) | STANDARD DEVIATION (LONGITUDE) | COVARIANCE (LATITUDE-LONGITUDE) |
|---|---|---|---|---|---|---|
| 15 | 45:345 | 37256062 | 1270200889 | 720 | 371 | 269181 |
| 15 | 345 | 37253042 | 1270200890 | 726 | 371 | 269140 |
| 345 | | 37256045 | 1270200891 | 1402 | 394 | 10494 |

LOCATION ESTIMATION METHOD AND ELECTRONIC DEVICE FOR PERFORMING THE SAME

CROSS-REFERENCE TO RELATED APPLICATION AND CLAIM OF PRIORITY

The present application is related to and claims the benefit under 35 U.S.C. § 119(a) of a Korean patent application filed on Feb. 3, 2016 in the Korean Intellectual Property Office and assigned Serial number 10-2016-0013343, the entire disclosure of which is hereby incorporated by reference.

TECHNICAL FIELD

The present disclosure relates to methods for estimating locations of electronic devices.

BACKGROUND

With the development of mobile communication technologies, while a user easily carries his or her electronic device, the electronic device may freely access a wired and wireless network. The electronic device may provide a variety of functions based on the execution of an application program obtained over the wired and wireless network. For example, the electronic device may execute an application program using the electronic device's location information and may provide a location based service (LBS) to the user.

The electronic device may obtain the electronic device's location information by having, for example, a global navigation satellite system (GNSS) circuit (e.g., a global positioning system (GPS) circuit and the like). The location information of the electronic device may include, for example, a latitude value and a longitude value and may be used as an important parameter of the LBS application program.

The electronic device may ascertain the electronic device's location using the GNSS circuit (e.g., the GPS module and the like). Herein, the electronic device should receive a signal transmitted from a satellite via the GNSS circuit. The electronic device receives the signal at a predetermined period depending on an application program, thus increasing battery consumption.

Meanwhile, if the GNSS circuit is not included in the electronic device, the electronic device may ascertain the electronic device's location by applying triangulation to locations of three or more base stations. However, in case of using the triangulation, since the electronic device should use a base station of a mobile communication service provider to which it subscribes, a location hit rate may be relatively reduced.

SUMMARY

Aspects of the present disclosure are to address at least the above-mentioned problems and/or disadvantages and to provide at least the advantages described below. Accordingly, an aspect of the present disclosure is to provide a method for estimating a location of an electronic device using information collected from a plurality of terminals (electronic devices) (through so-called crowdsourcing) and an electronic device for performing the same.

To address the above-discussed deficiencies, it is a primary object to provide an electronic device may include a memory, a communication circuit, and a processor configured to operatively connect with the memory and the communication circuit. The processor is configured to send identification information of a base station attached to the electronic device via the communication circuit to a server, receive first base station information about base stations included in a first area on the base station from the server, store the first base station information in the memory, and estimate a location of the electronic device based on properties of a signal received from at least one of the base stations included in the first area and the first base station information.

In accordance with another aspect of the present disclosure, an electronic device is provided. The electronic device may include a memory configured to store base station information corresponding to at least one base station, a communication circuit, and a processor. The processor is configured to verify status information associated with the electronic device, send the status information to an external electronic device using the communication circuit, receive updated base station information for at least part of the base station information, dynamically determined based on the at least status information, or another base station information corresponding to another base station from the external electronic device, and provide location information of the electronic device based on the at least updated base station information or the at least other base station information.

In accordance with another aspect of the present disclosure, a location estimation method is provided. The method may include sending identification information of a base station attached to the electronic device to a server, receiving first base station information about base stations included in a first area on the base station from the server, storing the first base station information in the memory, and estimating a location of the electronic device based on properties of a signal received from at least one of the base stations included in the first area and the first base station information.

In accordance with another aspect of the present disclosure, a computer-readable storage medium for storing instructions. The instructions may be configured to send identification information of a base station attached to the electronic device to a server, receive first base station information about base stations included in a first area on the base station from the server, store the first base station information in the memory, and estimate a location of the electronic device based on properties of a signal received from at least one of the base stations included in the first area and the first base station information.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1A:
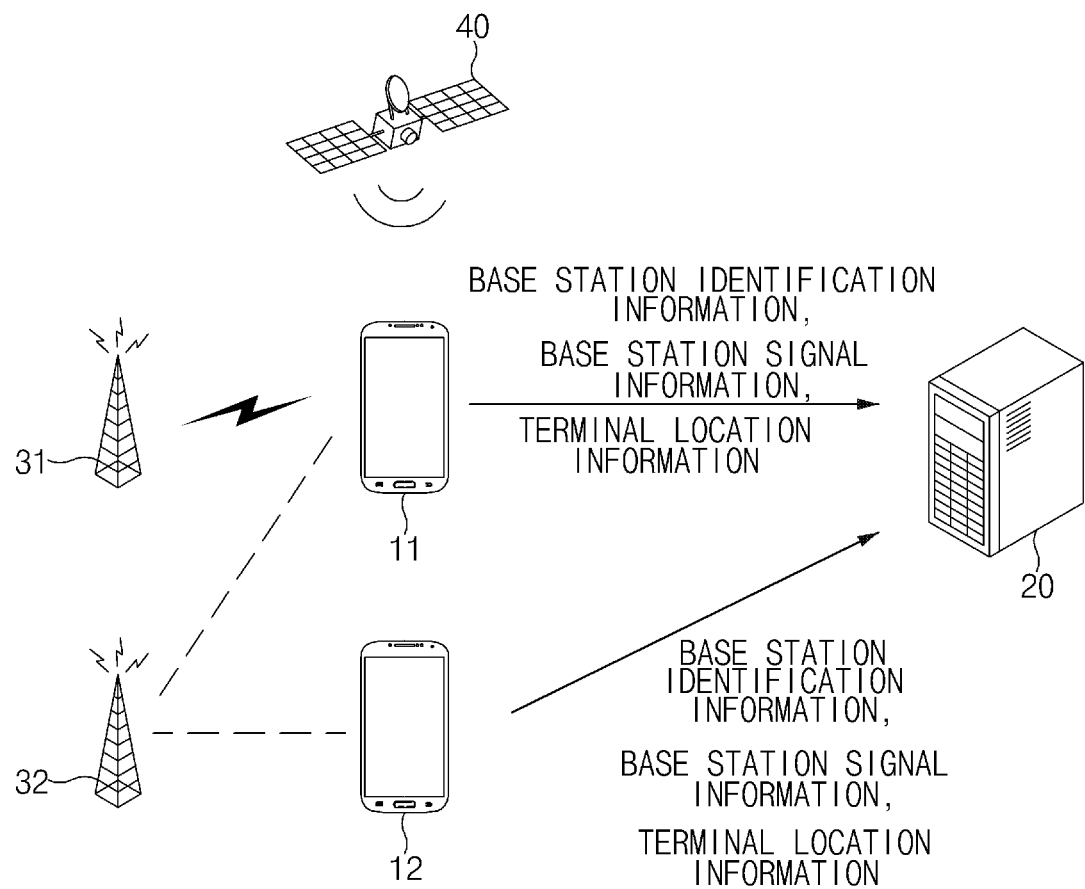
FIG. 1A illustrates an environment where a server collects a variety of information from a plurality of terminals according to an embodiment of the present disclosure.

FIGS. 1A through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged services and electronical devices.

Hereinafter, the present disclosure is described with reference to the accompanying drawings. However, the present disclosure is not intended to be limited to the specific embodiments, and it is understood that it should include all modifications and/or, equivalents and alternatives within the scope and technical range of the present disclosure. With respect to the descriptions of the drawings, like reference numerals refer to like elements.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The expressions such as "1st", "2nd", "first", or "second", and the like used in various embodiments of the present disclosure may refer to various elements irrespective of the order and/or priority of the corresponding elements, but do not limit the corresponding elements. The expressions may be used to distinguish one element from another element. For instance, both "a first user device" and "a second user device" indicate different user devices from each other irrespective of the order and/or priority of the corresponding elements. For example, a first component may be referred to as a second component and vice versa without departing from the scope of the present disclosure.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

Depending on the situation, the expression "configured to" used herein may be used as, for example, the expression "suitable for", "having the capacity to", "designed to", "adapted to", "made to", or "capable of". The term "configured to" must not mean only "specifically designed to" hardwarily. Instead, the expression "a device configured to" may mean that the device is "capable of" operating together with another device or other components. For example, a "processor configured to perform A, B, and C" may mean a generic-purpose processor (e.g., a central processing unit (CPU) or an application processor) which may perform corresponding operations by executing one or more software programs which stores a dedicated processor (e.g., an embedded processor) for performing a corresponding operation.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

Electronic devices according to various embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

In various embodiments, the electronic devices may be smart home appliances. The smart home appliances may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

In various embodiments, the electronic devices may include at least one of various medical devices (e.g., various portable medical measurement devices (e.g., blood glucose meters, heart rate meters, blood pressure meters, or thermometers, and the like), a magnetic resonance angiography (MRA), a magnetic resonance imaging (MRI), a computed tomography (CT), scanners, or ultrasonic devices, and the like), navigation devices, global navigation satellite system (GNSS), event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to various embodiments, the electronic devices may include at least one of parts of furniture or buildings/structures, electronic boards, electronic signature receiving devices, projectors, or various measuring instruments (e.g., water meters, electricity meters, gas meters, or wave meters, and the like). The electronic devices according to various embodiments of the present disclosure may be one or more combinations of the above-mentioned devices. The electronic devices according to various embodiments of the present disclosure may be flexible electronic devices. Also, electronic devices according to various embodiments of the present disclosure are not limited to the above-mentioned devices, and may include new electronic devices according to technology development Hereinafter, electronic devices according to various embodiments will be described with reference to the accompanying drawings. The term "user" used herein may refer to a person who uses an electronic device or may refer to a device (e.g., an artificial electronic device) that uses an electronic device.

FIG. 1A illustrates an environment where a server collects a variety of information from a plurality of terminals according to an embodiment of the present disclosure.

Referring to FIG. 1A, electronic devices (or terminals) 11 and 12, a server 20, base stations 31 and 32, and a satellite 40 (e.g., a global navigation satellite system (GNSS) satellite) are shown.

Each of the electronic devices 11 and 12 may communicate with the server 20, the base stations 31 and 32, and/or the GNSS satellite 40 over at least one network. For example, each of the electronic devices 11 and 12 may access a cellular network by being attached to the base station 31. According to an embodiment, each of the electronic devices 11 and 12 may detect a signal transmitted from the other base station 32 neighboring to the base station 31 at the same time as receiving a signal transmitted from the base station 31.

According to an embodiment, each of the electronic devices 11 and 12 may communicate control information and/or data with the server 20 over various wired and wireless networks. For example, each of the electronic devices 11 and 12 may collect base station identification information (hereinafter simply referred to as "identification information"), base station signal information, and/or terminal location information and may send the collected information to the server 20. For example, the base station identification information may include identification information of a base station (i.e., the base station 31) attached to the electronic devices 11 and 12 to access the cellular network and identification information of a base station (i.e., the base station 32) neighboring to the attached base station. The base station signal information may include information, for example, sensitivity and quality of a signal received from each of the base stations 31 and 32. The terminal location information may correspond to, for example, location information of each of the electronic devices 11 and 12, received from the GNSS satellite 40.

According to various embodiments, each of the electronic devices 11 and 12 may be referred to as a terminal, user equipment (UE), a motion station (MS), mobile equipment (ME), a mobile terminal (MT), a user terminal (UT), a subscriber station (SS), a wireless device, a handheld device, or the like.

The server 20 may receive information collected from each of the electronic device 11 and 12 and may store the collected information in a memory embedded in the server 20. For example, the server 20 may generate data (e.g., patch data described below) necessary for each of the electronic device 11 and 12 to ascertain the electronic device's location, using the base station identification information, the base station signal information, and/or the terminal location information received from each of the electronic device 11 and 12. FIG. 1A illustrates the two electronic devices 11 and 12 for convenience of description, but the server 20 may collect base station identification information, base station signal information, and/or terminal location information from each of a plurality of electronic devices.

The server 20 may provide the data to each of the electronic device 11 and 12 in response to a request from each of electronic device 11 and 12.

Each of the base stations 31 and 32 may mean a fixed station which communicates with the electronic device 11 and 12 and/or another base station. For example, each of the base stations 31 and 32 may support for the electronic device 11 and 12 to access the cellular network.

According to an embodiment, the base station 31 which supports for the electronic device 11 and 12 to access the cellular network may be referred to as a serving base station. Meanwhile, the base station 32 may not support for the electronic device 11 and 12 to access the cellular network. However, since the base station 32 is contiguous to the serving base station 31, a signal of the base station 32 may reach the electronic device 11 and 12. In this case, the base station 32 may be referred to as a neighboring base station.

According to an embodiment, each of the base stations 31 and 32 may be referred to as a transmission point (TP), an advanced base station (ABS), a node-B (NB), an evolved-nodeB (eNB), a base transceiver system (BTS), an access point (AP), a processing server (PS), or the like.

The GNSS satellite 40 may provide information (terminal location information) about latitude and longitude at which the corresponding one of the electronic devices 11 and 12 is located, in response to a request of each of the electronic devices 11 and 12. A positioning system implemented by the GNSS satellite 40 may include, for example, at least one of a global positioning system (GPS), a global navigation satellite system (Glonass), a Beidou navigation satellite system (hereinafter referred to as "Beidou"), or a Galileo (i.e., the European global satellite-based navigation system) according to an available area, a bandwidth, or the like.

Figure 1B:
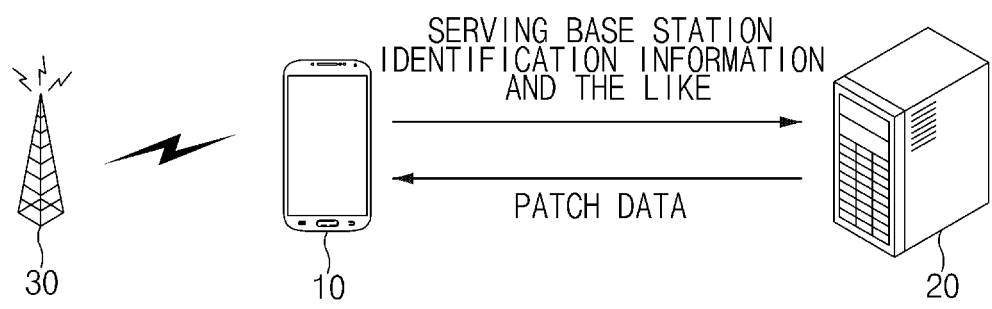
FIG. 1B illustrates an environment where an electronic device receives patch data from a server according to an embodiment of the present disclosure.

FIG. 1B illustrates an environment where an electronic device receives patch data from a server according to an embodiment of the present disclosure.

Referring to FIG. 1B, an electronic device 10, a server 20, and a base station are shown. The electronic device 10 may correspond to each of electronic devices 11 and 12 of FIG. 1A. The base station 30 may correspond to a base station 31 of FIG. 1A. A repeated description for the same components as components shown in FIG. 1A or components corresponding to the components shown in FIG. 1A will be omitted below. An operation of the electronic device 10 and/or the server 20 described with reference to FIG. 1B may be performed, for example, after operations of the electronic devices 11 and 12 and/or the server 20 described with reference to FIG. 1A are performed.

The electronic device 10 may access a cellular network via, for example, the base station 30 (e.g., a serving base station). The electronic device 10 may identify identification information (base station identification information) of the base station 30 from properties of a signal received from the base station 30.

According to an embodiment, the electronic device 10 may send identification information (serving base station identification information) of the base station 30 and the like to the server 20 to ascertain the electronic device's location. The server 20 may generate, for example, patch data for estimating a location of the electronic device 10, based on the serving base station identification information and the like received from the electronic device 10. The generated patch data may be provided to the electronic device 10 to be used to estimate the location of the electronic device 10.

The patch data may correspond to base station information of base stations included in an area. The base station information may include, for example, location information of each of the base stations included in the area or coverage information of the base stations included in the area.

Figure 2:
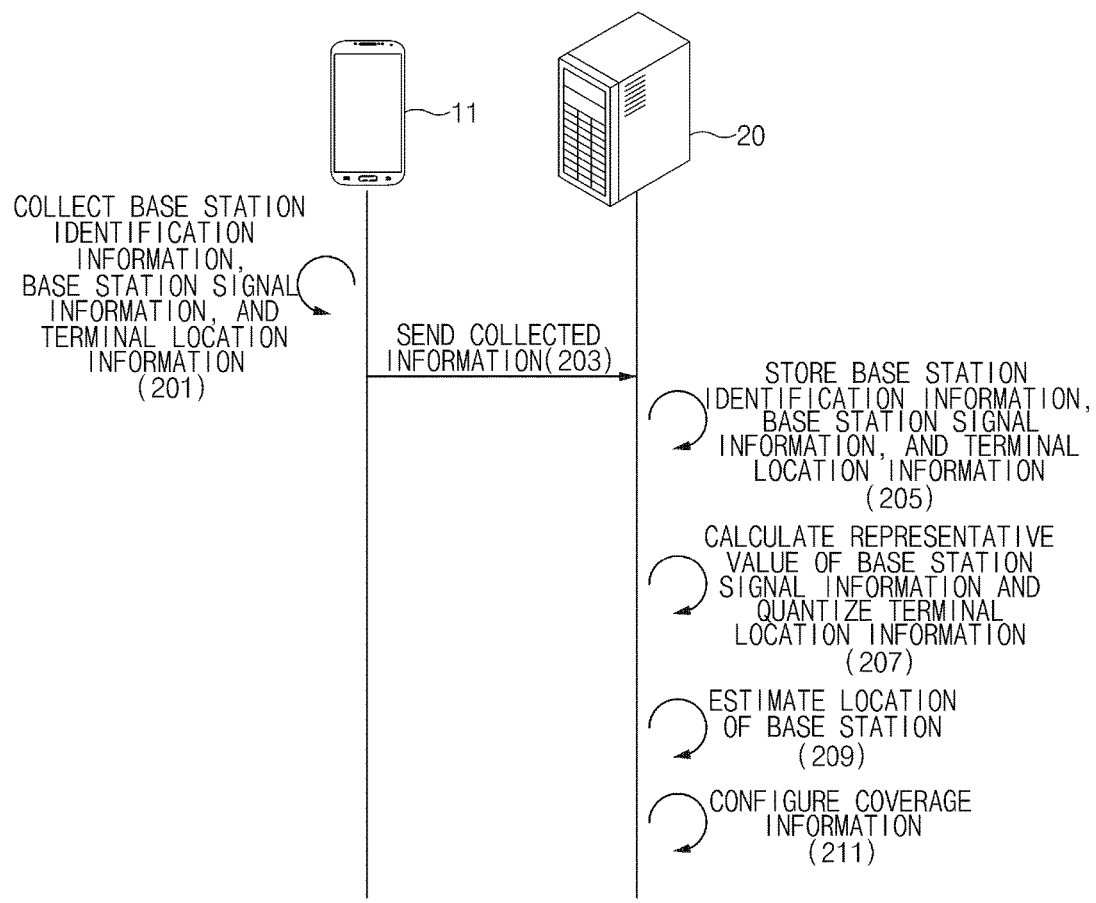
FIG. 2 illustrates a method for configuring patch data in a server according to an embodiment of the present disclosure.
Figure 3:
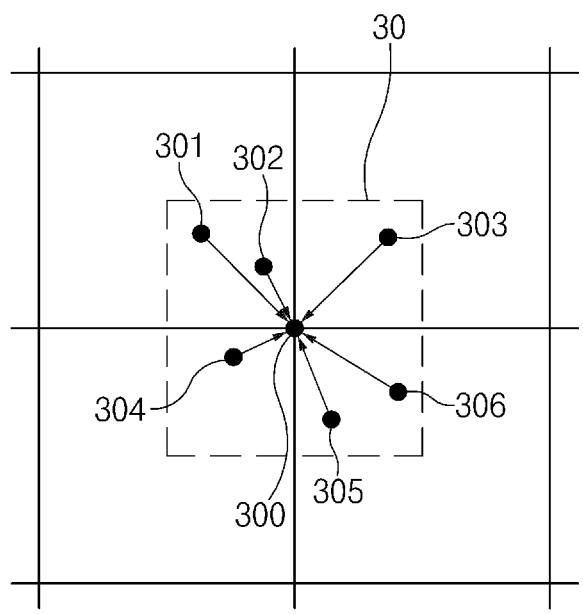
FIG. 3 illustrates an operation of estimating a location of a base station in a server according to an embodiment of the present disclosure.

The location information of each of the base stations may be estimated by quantizing, for example, terminal location information received from a plurality of electronic devices (terminals) (refer to FIGS. 2 and 3). Also, the coverage information may include, for example, location information in which one or more of signals transmitted from the base stations included in the area are detected.

Figure 4:
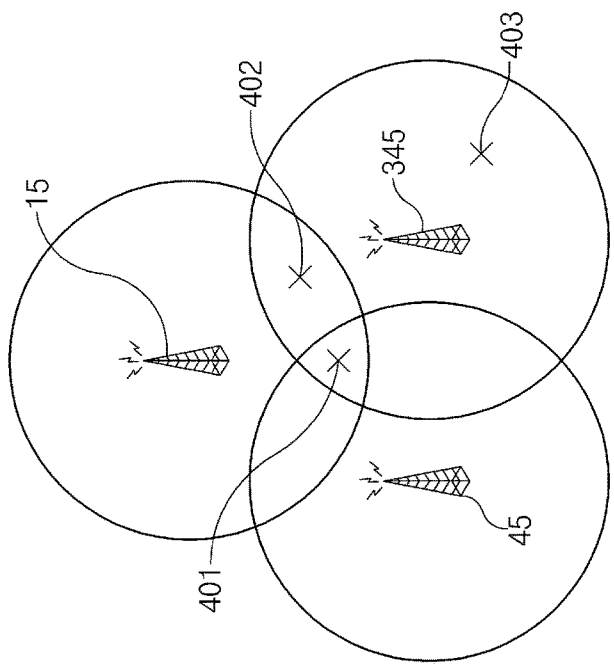
FIG. 4 illustrates coverage information according to an embodiment of the present disclosure.

FIG. 2 illustrates a method for configuring patch data in a server according to an embodiment of the present disclosure. FIG. 3 illustrates an operation of estimating a location of a base station in a server according to an embodiment of the present disclosure. FIG. 4 illustrates coverage information according to an embodiment of the present disclosure.

Referring to FIG. 2, operations of an electronic device 11 and a server 20 are shown. The operations described with reference to FIG. 2 may be associated with operations of an electronic device 11 and a server 20 shown in FIG. 1A. Also, as described above, the electronic device 11 may be one of a plurality of electronic device which send collected information (e.g., base station identification information, base station signal information, and/or terminal location information) to the server 20.

In operation 201, for example, the electronic device 11 may collect base station identification information, base station signal information, and terminal location information. For example, the electronic device 11 may obtain the base station identification information and the base station signal information from a signal transmitted from at least one base station. Also, for example, the electronic device 11 may obtain the electronic device's location information, that is, terminal location information from a GNSS satellite.

For example, the base station identification information may include at least one of a mobile country code (MCC), a mobile network code (MNC), a tracking area code (TAC), a global cell identifier (ID) of a cell managed by a serving base station, a physical cell ID, and an evolved universal terrestrial radio access (E-UTRA) absolute radio frequency channel number_downlink (EARFCN_DL).

The base station signal information may include at least one of timing advance (TA), a signal to noise ratio (SNR), a reference signal received power (RSRP), a reference signal received quality (RSRQ), and a received signal strength indication (RSSI). According to an embodiment, the base station signal information may include at least one of a global cell ID of a cell managed by a neighboring base station, a physical cell ID, an RSRP, and an EARFCN_DL.

For example, the TA may indicate a time taken for which the electronic device 11 a base station to sends a specific signal to the base station, and then receives a response signal to a the specific signal from to the electronic device 11 after the electronic device 11 sends the specific signal to the base station. The specific signal may follow is compliant with a communication protocol between the base station and the electronic device 11. The time taken may be obtained based on a timestamp value written in a medium access control/physical layer (MAC/PHY) frame determined in the communication protocol.

The terminal location information may be received from the GNSS satellite and may include a latitude value and/or a longitude value of the electronic device 11.

In operation 203, for example, the electronic device 11 may send the base station identification information, the base station signal information, and the terminal location information collected in operation 201 to the server 20.

In operation 205, for example, the server 20 may store the base station identification information, the base station signal information, and the terminal location information received in operation 203.

In operation 207, for example, the server 20 may receive a plurality of base station signal information and a plurality of terminal location information from a plurality of electronic devices including the electronic device 11, and may calculate a representative value using the received information.

For example, the server 20 map may plot (or map) the plurality of terminal location information received from the plurality of electronic devices onto a map, and may quantize the plurality of mapped terminal location information, and to determine a representative value of the plurality of terminal location information. For example, the server 20 may partition the map into grids with a spacing (e.g., 20 m) and may quantize the plurality of terminal location information to grid points (GPs) among the grids.

For example, referring to FIG. 3, the server 20 may classify the surface of the earth surface into grids with spacing and may assign a representative value of terminal location information to GPs of the classified grids. According to an embodiment, the server 20 may quantize terminal location information 301 to 306 of terminals included in a specified area 30 to determine representative location information 300. In other words, the terminal location information 301 to 306 may converge into location information of the closest GP from their location information. The server 20 may estimate a location of a base station from the representative location information 300.

Also, for example, the server 20 may calculate a representative value of a plurality of base signal information received from the plurality of electronic devices. For example, the server 20 may use an average value of the plurality of base signal information as the representative value.

In operation 209, for example, the server 20 may apply a specified algorithm to the terminal location information quantized in operation 207 to estimate a location of the base station. Assuming that one (e.g., the representative location information 300 of FIG. 3) of a plurality of GPs may be potentially the location of the base station, the server 20 may apply a rank correlation algorithm based on relation between base signal information (e.g., TA) and a distance with other GPs to finally estimate the location of the base station.

In operation 211, for example, the server 20 may configure coverage information. The coverage information may include location information which has a combination of base station identification information (e.g., a physical cell ID) of a serving base station and base station identification information (e.g., a physical cell ID) of a neighboring base station as a key.

For example, referring to FIG. 4, a drawing for illustrating coverage information is shown. The coverage information may include location information corresponding to a combination of base station identification information, which has base station identification information (e.g., a serving base station ID) of a serving base station and base station identification information (e.g., a neighboring base station ID) of a neighboring base station as a key. For example, the location information may include latitude/longitude and elements (e.g., standard deviation and variance) for supporting the location information. In other words, the coverage information may correspond to location information for detecting signals transmitted from the serving base station and the neighboring base station.

Referring to a Table shown in FIG. 4, in an area, if a serving base station ID identified from a signal transmitted from the serving base station is "5" and if neighboring base station IDs identified from a signal transmitted from the neighboring base station are "45" and "345", the area may correspond to a representative location 401, latitude of which has "37256062" and longitude of which has "1270200889". For example, an area where all of cells managed by a base station A 15, a base station B 45, and a base station C 345 are overlapped with one another may be represented as the representative location 401 (the latitude of "37256062" and the longitude of "1270200889").

In another area, if a serving base station ID identified from a signal transmitted from the serving base station is "15" and if a neighboring base station ID identified from a signal transmitted from the neighboring base station is "345", the other area may correspond to a representative location 402, latitude of which has "37253042" and longitude of which has "1270200890". In other words, an area where the cells managed by the base station A 15 and the base station C 345 are overlapped (except for the area where all the cells managed by the base station A 15, the base station B 45, and the base station C 345 are overlapped with one another) may be represented as the representative location 402 (the latitude of "37253042" and the longitude of "1270200890").

Similarly, also, in another area, a serving base station ID identified from a signal transmitted from the serving base station is "345" and a signal transmitted from the neighboring base station may fail to be received. In this case, the other area may correspond to a representative location 403, latitude of which has "37256045" and longitude of which has "1270200891". For example, an area a signal of another neighboring base station does not reach among cells managed by the base station C 345 may be represented as the representative location 403 (the latitude of "37256045" and the longitude of "1270200891").

Values of A standard deviation and a variance associated with the representative locations 401 to 403 may be used to correct the representative locations 401 to 403.

For example, an electronic device located in the area where all the cells managed by the base station A 15, the base station B 45, and the base station C 345 are overlapped with one another may be attached to the base station A 15 and may detect signals transmitted from the base station B 45 and the base station C 345. In other words, a serving base station of the electronic device may be the base station A 15, and neighboring base stations of the electronic device may be the base station B 45 and the base station C 345. The electronic device may receive coverage informnation corresponding to the base station identification information from a server and may estimate the electronic device's location.

In operation 209, for example, the estimated location information of the base station in operation 209 and the coverage information configured in operation 211 may be mapped plotted onto a map and may be stored in form of a database. If the base station location information and the coverage information are mapped plotted onto the map, and if the mapped map is classified every a latitude of 0.02° (about 2 km)*a longitude of 0.02° (about 2 km), data mapped to the corresponding corresponds to a certain classified area may can be referred to as patch data (or base station information). In other words, the patch data (or the base station information) may include location information and coverage information of base stations included in at least one unit (patch) area (e.g., the latitude of 0.02°*the longitude of 0.02°)

Figure 5:
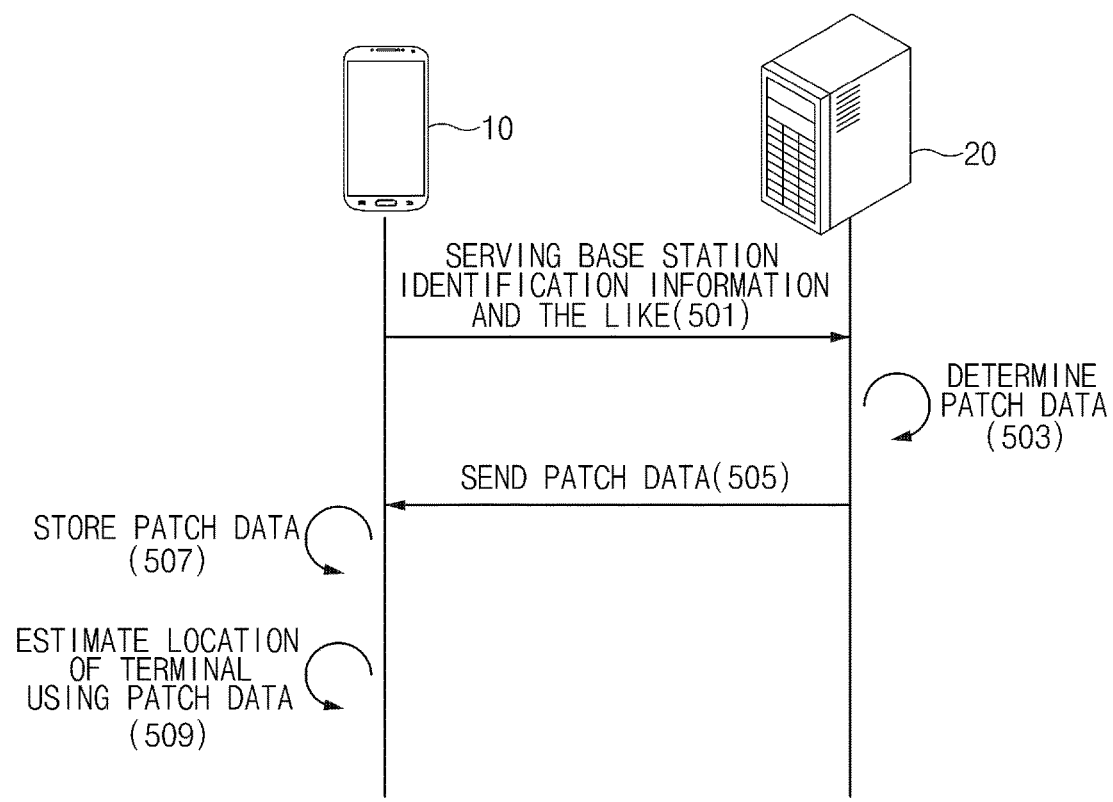
FIG. 5 illustrates an operation of estimating a location of an electronic device based on patch data in the electronic device according to an embodiment of the present disclosure.

FIG. 5 illustrates an operation of estimating a location of an electronic device based on patch data in the electronic device according to an embodiment of the present disclosure.

Referring to FIG. 5, operations of an electronic device 10 and a server 20 are shown. Operations described with reference to FIG. 5 may be associated with operations of an electronic device 10 and a server 20 shown in FIG. 1B.

In operation 501, if connected with a serving base station, the electronic device 10 may send base station identification information of the serving base station to the server 20. The electronic device 10 may further send a message for requesting to send patch data or the electronic device's state (e.g., the electronic device's movement speed and the like) other than the base station identification information.

In operation 503, the server 20 may ascertain a location of the serving base station using the base station identification information of the serving base station and previously stored base station location information. Next, the server 20 may determine patch data (or base station information) for an area on the location of the serving base station. The patch data may include location information and coverage information of base stations included in the area.

According to an embodiment, the area may correspond to an integer multiple of a unit path area. According to various embodiments, the server 20 may specify the area based on the state (e.g., a speed and the like) of the electronic device 10, received from the electronic device 10.

In operation 505, the server 20 may send the patch data determined in operation 503 to the electronic device 10.

In operation 507, the electronic device 10 may store the received patch data in a memory embedded in the electronic device 10.

In operation 509, the electronic device 10 may estimate the electronic device's location using the patch data (including the location information and the coverage information of the base stations included in the area) received from the server 20.

For example, the electronic device 10 may detect signals transmitted from a serving base station and a neighboring base station, may identify base station identification information of each of the serving base station and the neighboring base station, and may ascertain base station location information corresponding to the base station identification information of each of the serving base station and the neighboring base station. The electronic device 10 may apply triangulation to location information of each of the serving base station and the neighboring base station to estimate the electronic device's location.

For another example, the electronic device 10 may detect signals transmitted from the serving base station and the neighboring base station and may identify base station identification information of each of the serving base station and the neighboring base station. The electronic device 10 may verify representative location information with reference to coverage information by using the base station identification information of each of the serving base station and the neighboring base station as a key. The electronic device 10 may estimate the representative location information as the electronic device's location information.

According to various embodiments, the electronic device 10 may correct the location estimated based on the triangulation, using the location information estimated based on the coverage information.

Figure 6:
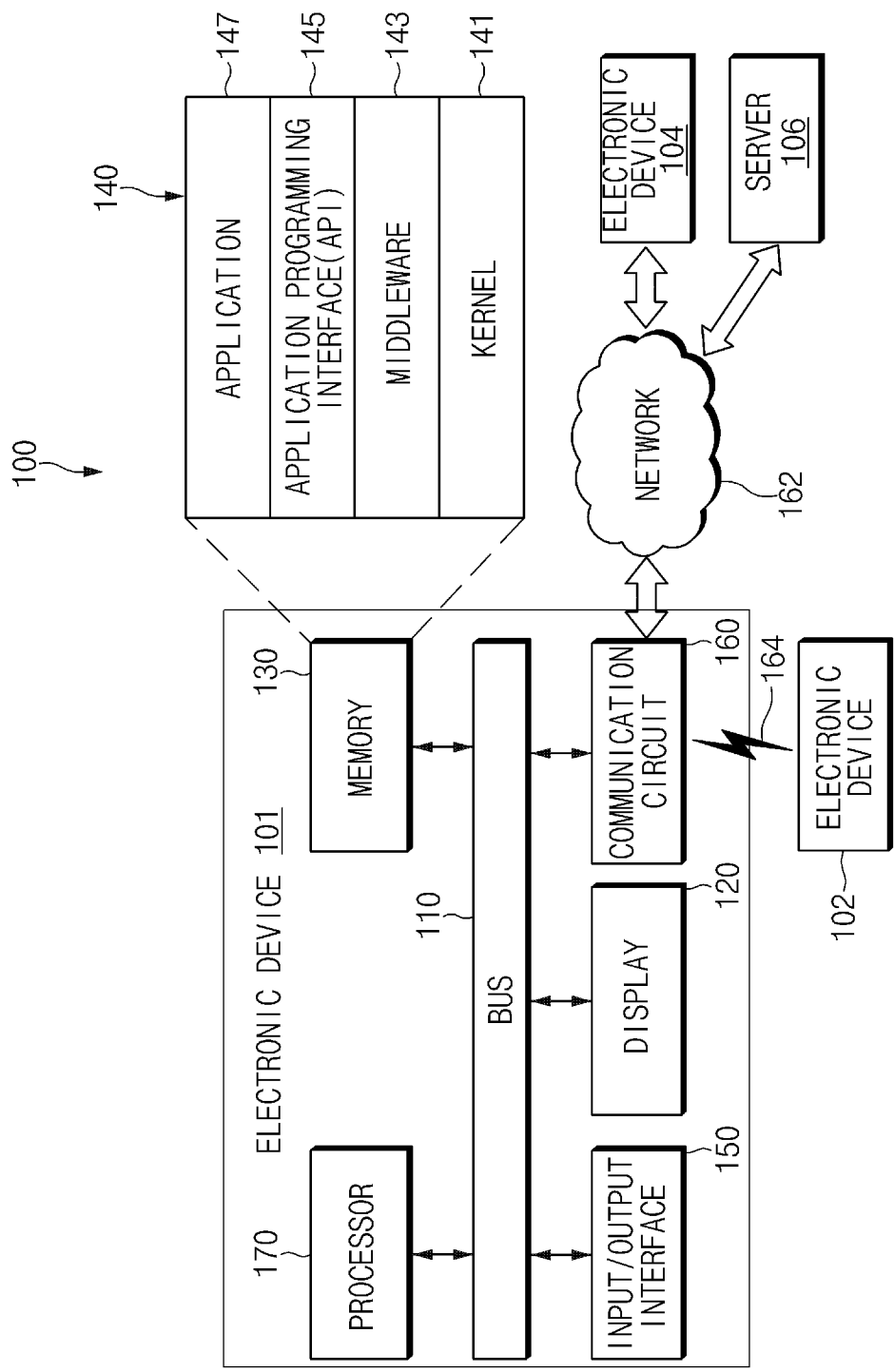
FIG. 6 illustrates a configuration of an electronic device according to various embodiments of the present disclosure.

FIG. 6 illustrates a configuration of an electronic device according to various embodiments of the present disclosure.

Referring to FIG. 6, in various embodiments, an electronic device 101 may connect with a first external electronic device 102 over local-area communication 164 or may connect with a second external electronic device 104 or a server 106 over a network 162. For example, the electronic device 101 may correspond to an electronic device 11 or 12 shown in FIG. 1A or an electronic device 10 shown in FIG. 1B. The server 106 may correspond to a server 20 shown in FIGS. 1A and 1B.

The electronic device 101 may include a bus 110, a display 120, a memory 130, an input/output (I/O) interface 150, a communication circuit 160, and a processor 170. In various embodiments, at least one of the components of the electronic device 101 may be omitted from the electronic device 101, and other components may be additionally included in the electronic device 101.

The bus 110 may include, for example, a circuit which connects the components 120 to 170 with each other and sends communication (e.g., a control message and/or data) between the components 120 to 170.

The display 120 may include, for example, a liquid crystal display (LCD), a light emitting diode (LED) display, an organic LED (OLED) display, a microelectromechanical systems (MEMS) display, or an electronic paper display. The display 120 may display, for example, a variety of content (e.g., text, an image, a video, an icon, or a symbol, and the like) to a user of the electronic device 101. The display 120 may include a touch screen, and may receive, for example, a touch, a gesture, proximity, or a hovering input using an electronic pen or part of a body of the user.

The memory 130 may include a volatile and/or nonvolatile memory. The memory 130 may store, for example, a command or data associated with at least another of the components of the electronic device 101. For example, the memory 130 may store patch data (base station information of base stations included in an area, including location information and coverage information of the base stations) received from the server 106.

According to an embodiment, a specified specific security policy may be applied to the memory 130 (e.g., a trust zone). Also, the memory 130 may be implemented to be included in the processor 170 (e.g., a communication processor (CP)).

According to an embodiment, the memory 130 may store software and/or a program 140. The program 140 may include, for example, a kernel 141, a middleware 143, an application programming interface (API) 145, and/or at least one application program 147 (or "at least one application"), and the like. At least part of the kernel 141, the middleware 143, or the API 145 may be referred to as an operating system (OS).

The kernel 141 may control or manage, for example, system resources (e.g., the bus 110, the processor 170, or the memory 130, and the like) used to execute an operation or function implemented in the other programs (e.g., the middleware 143, the API 145, or the application program 147). Also, as the middleware 143, the API 145, or the application program 147 accesses a separate component of the electronic device 101, the kernel 141 may provide an interface which may control or manage system resources.

The middleware 143 may play a role as, for example, a go-between such that the API 145 or the application program 147 communicates with the kernel 141 to communicate data with the kernel 141.

Also, the middleware 143 may process one or more work requests, received from the at least one application program 147, in order of priority. For example, the middleware 143 may assign priority which may use system resources (the bus 110, the processor 170, or the memory 130, and the like) of the electronic device 101 to at least one of the at least one application program 147. For example, the middleware 143 may perform scheduling or load balancing for the one or more work requests by processing the one or more work requests in order of priority assigned to the at least one of the at least one application program 147.

The API 145 may be, for example, an interface in which the application program 147 controls a function provided from the kernel 141 or the middleware 143. For example, the API 145 may include at least one interface or function (e.g., a command) for file control, window control, image processing, or text control, and the like.

The I/O interface 150 may play a role as, for example, an interface which may send a command or data, input from a user or another external device, to another component (or other components) of the electronic device 101. Also, the I/O interface 150 may output a command or data, received from another component (or other components) of the electronic device 101, to the user or the other external device.

The communication circuit 160 may establish communication between, for example, the electronic device 101 and an external device (e.g., the first external electronic device 102, the second external electronic device 104, or the server 106). For example, the communication circuit 160 may connect to the network 162 through wireless communication or wired communication and may communicate with the external device (e.g., the second external electronic device 104 or the server 106).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication may include, for example, the local-area communication 164. The local-area communication 164 may include, for example, at least one of wireless-fidelity (Wi-Fi) communication, Bluetooth (BT) communication, near field communication (NFC) communication, magnetic secure transmission communication, radio frequency (RF) communication, or body area network (BAN) communication. According to an embodiment, the wireless communication may include GNSS communication.

An MST circuit may generate a pulse based on transmission data using an electromagnetic signal and may generate a magnetic field signal based on the pulse. The electronic device 101 may send the magnetic field signal to a point of sales (POS) system. The POS system may restore the data by detecting the magnetic field signal using an MST reader and converting the detected magnetic field signal into an electric signal.

The GNSS may include, for example, at least one of a global positioning system (GPS), a global navigation satellite system (Glonass), a Beidou navigation satellite system (hereinafter referred to as "Beidou"), or a Galileo (i.e., the European global satellite-based navigation system) according to an available area or a bandwidth, and the like. Hereinafter, the "GPS" used herein may be interchangeably with the "GNSS". The wired communication may include at least one of, for example, universal serial bus (USB) communication, high definition multimedia interface (HDMI) communication, recommended standard 232 (RS-232) communication, or plain old telephone service (POTS) communication, and the like. The network 162 may include a telecommunications network, for example, at least one of a computer network (e.g., a local area network (LAN) or a wide area network (WAN)), the Internet, or a telephone network.

The processor 170 may include one or more of a central processing unit (CPU), an application processor (AP), or a communication processor (CP). The processor 170 may operatively connect with, for example, at least another of the components 110 to 160 of the electronic device 101 and may perform calculation or data processing about control and/or communication of at least another of the components of the electronic device 101.

According to an embodiment, the processor 170 may send base station identification information of a base station (a serving base station) attached to the electronic device 101 via the communication circuit 160 to the server 106. For example, the base station identification information may include at least one of an MCC, an MNC, a TAC, a global cell ID, a physical cell ID, and an EARFCN_DL.

The processor 170 may receive first base station information (e.g., patch data of a first area) about base stations included in the first area on a serving base station from the server 106 and may store the first base station information in the memory 130.

The processor 170 may estimate a location of the electronic device 101 based on properties of a signal received from at least one of the base stations included in the first area and the first base station information.

According to an embodiment, the processor 170 may select a base station to apply triangulation among the at least one of the base stations included in the first area, based on the properties of the signal received from the at least one base station. For example, the processor 170 may select the base station to apply the triangulation, based on intensity or quality of the signal received from the at least one base station. The processor 170 may apply the triangulation to location information of the selected base station (included in base station information (patch data) received from the server 106) to estimate a location of the electronic device 101.

According to an embodiment, the processor 170 may identify base station identification information of the at least one base station from the properties of the signal received from the at least one of the base stations included in the first area. For example, the base station identification information may include identification information of a serving base station and/or identification information of a neighboring base station. The processor 170 may estimate a location of the electronic device 101 with reference to coverage information (included in base station information (patch data)

received from the server 106) by using the identified base station identification information as a key. For example, the processor 170 may estimate representative location information ascertained from the coverage information as location information of the electronic device 101.

According to an embodiment, the processor 170 may correct the location estimated based on the triangulation, using the location information estimated based on the coverage information.

Further, according to an embodiment, if the estimated location of the electronic device 101 reaches a boundary of the first area, the processor 170 may receive second base station information (patch data) about base stations included in a second area neighboring to the first area from the server 106.

According to an embodiment, a size of the second area may be determined based on a speed of the electronic device 101. The speed of the electronic device 101 may be derived from, for example, the estimated location and time information at the estimated location.

According to an embodiment, if a base station attached to the electronic device 101 is handed over to another base station, the processor 170 may send base station identification information of the other base station to the server 106. The processor 170 may receive third base station information about base stations included in a third area on the other base station from the server 106.

Each of the first and second external electronic devices 102 and 104 may be the same as or different device from the electronic device 101. According to an embodiment, the server 106 may include a group of one or more servers. According to various embodiments, all or some of operations executed in the electronic device 101 may be executed in another electronic device or a plurality of electronic devices (e.g., the first external electronic device 102, the second external electronic device 104, or the server 106). According to an embodiment, if the electronic device 101 should perform any function or service automatically or according to a request, it may request another device (e.g., the first external electronic device 102, the second external electronic device 104, or the server 106) to perform at least part of the function or service, rather than executing the function or service for the second external electronic device or in addition to the function or service. The other electronic device (e.g., the first external electronic device 102, the second external electronic device 104, or the server 106) may execute the requested function or the added function and may transmit the executed result to the electronic device 101. The electronic device 101 may process the received result without change or additionally and may provide the requested function or service. For this purpose, for example, cloud computing technologies, distributed computing technologies, or client-server computing technologies may be used.

Figure 7A:
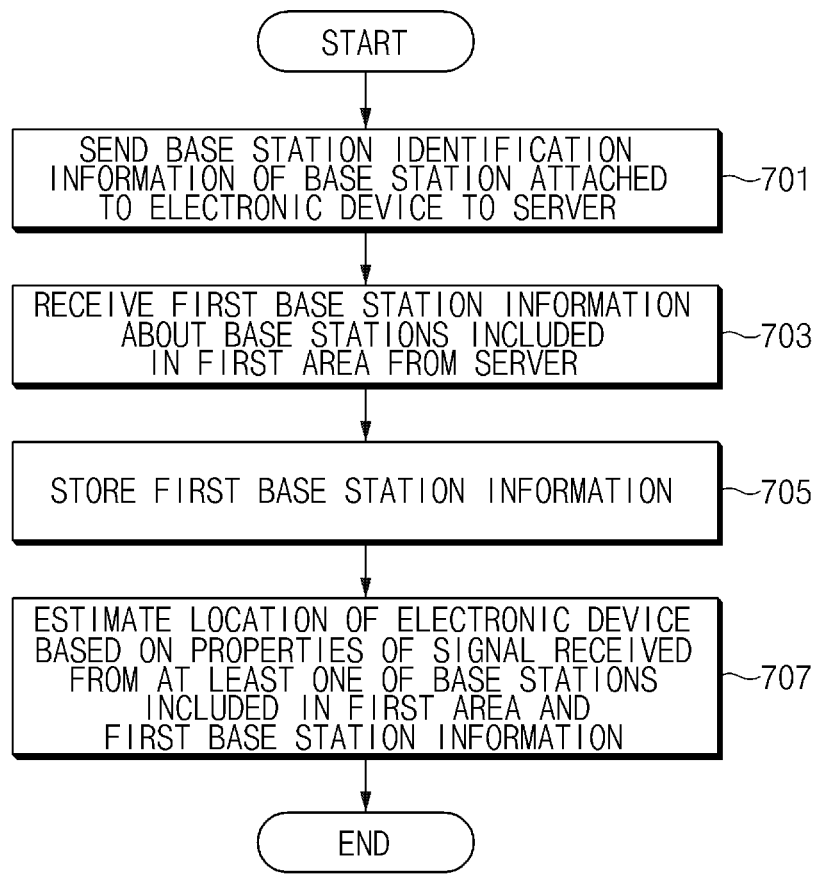
FIG. 7A illustrates a flow chart of a method for estimating a location of an electronic device according to an embodiment of the present disclosure.

FIG. 7A illustrates a flowchart of a method for estimating a location of an electronic device according to an embodiment of the present disclosure.

Referring to FIG. 7A, the method for estimating the location of the electronic device according to an embodiment may include operations 701 to 707. Operations 701 to 707 may be performed by, for example, an electronic device 101 shown in FIG. 6. Each of operations 701 to 707 may be implemented with instructions which may be performed (or executed) by a processor 170 of the electronic device 101. The instructions may be stored in, for example, a computer storage medium or a memory 130 of the electronic device 101. Hereinafter, reference numerals of FIG. 6 are used for describing operations 701 to 707.

In operation 701, the processor 170 may send base station identification information of a base station (a serving base station) attached to the electronic device 101 via a communication circuit 160 to a server 106. The base station identification information may include, for example, at least one of an MCC, an MNC, a TAC, a global cell ID, a physical cell ID, and an EARFCN_DL.

In operation 703, the processor 170 may receive first base station information (patch data of a first area) about base stations included in the first area on the serving base station from the server 106. The first base station information (the patch data of the first area) may include location information of each of the base stations included in the first area and/or coverage information of the base stations included in the first area.

In operation 705, the processor 170 may store the first base station (the patch data of the first area) in the memory 130.

In operation 707, the processor 170 may estimate a location of the electronic device 101 based on properties of a signal received from at least one of the base stations included in the first area and the first base station information (the patch data of the first area) stored in the memory 130.

Figure 7B:
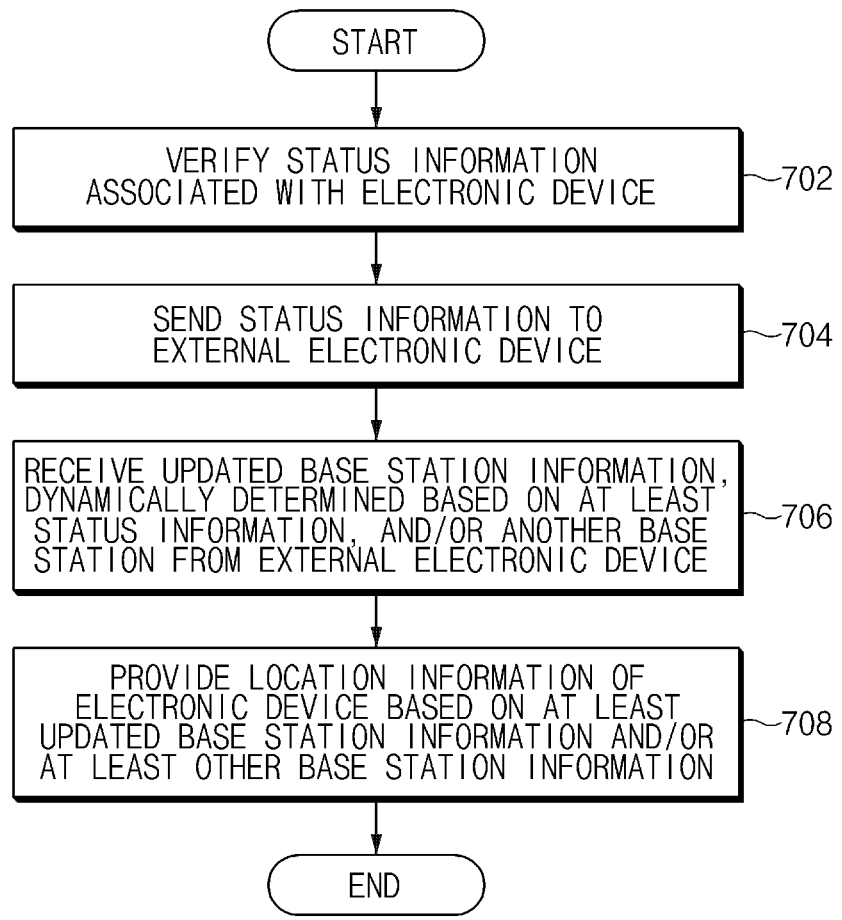
FIG. 7B illustrates flow chart of a method for estimating a location of an electronic device according to another embodiment of the present disclosure.

FIG. 7B illustrates a flowchart of a method for estimating a location of an electronic device according to another embodiment of the present disclosure.

Referring to FIG. 7B, the method for estimating the location of the electronic device according to an embodiment may include operations 702 to 708. Operations 702 to 708 may be performed by, for example, an electronic device 101 shown in FIG. 6. Each of operations 702 to 708 may be implemented with instructions which may be performed (or executed) by a processor 170 of the electronic device 101. The instructions may be stored in, for example, a computer storage medium or a memory 130 of the electronic device 101. Hereinafter, reference numerals of FIG. 6 are used for describing operations 702 to 708.

In operation 702, the electronic device 101 may verify status information associated with the electronic device 101. For example, the electronic device 101 may verify location information of the electronic device 101, a movement speed of the electronic device 101, a size of the memory 130 embedded in the embedded, or combinations thereof as at least part of the status information.

In operation 704, the electronic device 101 may send the status information to an external electronic device (e.g., a server 106).

In operation 706, the electronic device 101 may receive base station information (patch data), dynamically determined based on the at least status information in the external electronic device, from the external electronic device (e.g., the server 106). For example, the base station information (the patch data) may include updated base station (patch data) for at least part of base station (patch data) stored in the memory 130 of the electronic device 101 and/or another base station information (patch data) corresponding to another base station.

According to an embodiment, if meeting a specified condition, the electronic device 101 may receive base station information (patch data) from the external electronic device (e.g., the server 106). For example, if the status information verified in operation 702 meets a first specified condition, the electronic device 101 may receive first base station information as at least part of the updated base station information or the other base station information. Also, if the status information meets a second specified condition, the electronic device 101 may receive second base station information as at least part of the updated base station information or the other base station information.

According to an embodiment, the electronic device 101 may receive information corresponding to a first base station set among at least one base station or the other base station as at least part of the first base station information. Also, the electronic device 101 may receive information corresponding to a second base station set among the at least one base station or the other base station as at least part of the second base station information.

In operation 708, the electronic device 101 may provide the electronic device's location information based on the at least updated base station information or the at least other base station information. In this case, the electronic device 101 may verify base station density information corresponding to the at least one base station or the other base station, based on the at least updated base station information or the at least other base station information. Next, the electronic device 101 may delete at least part of the updated base station information or the other base station information from the memory 130 based on the at least base station density information.

Figure 8:
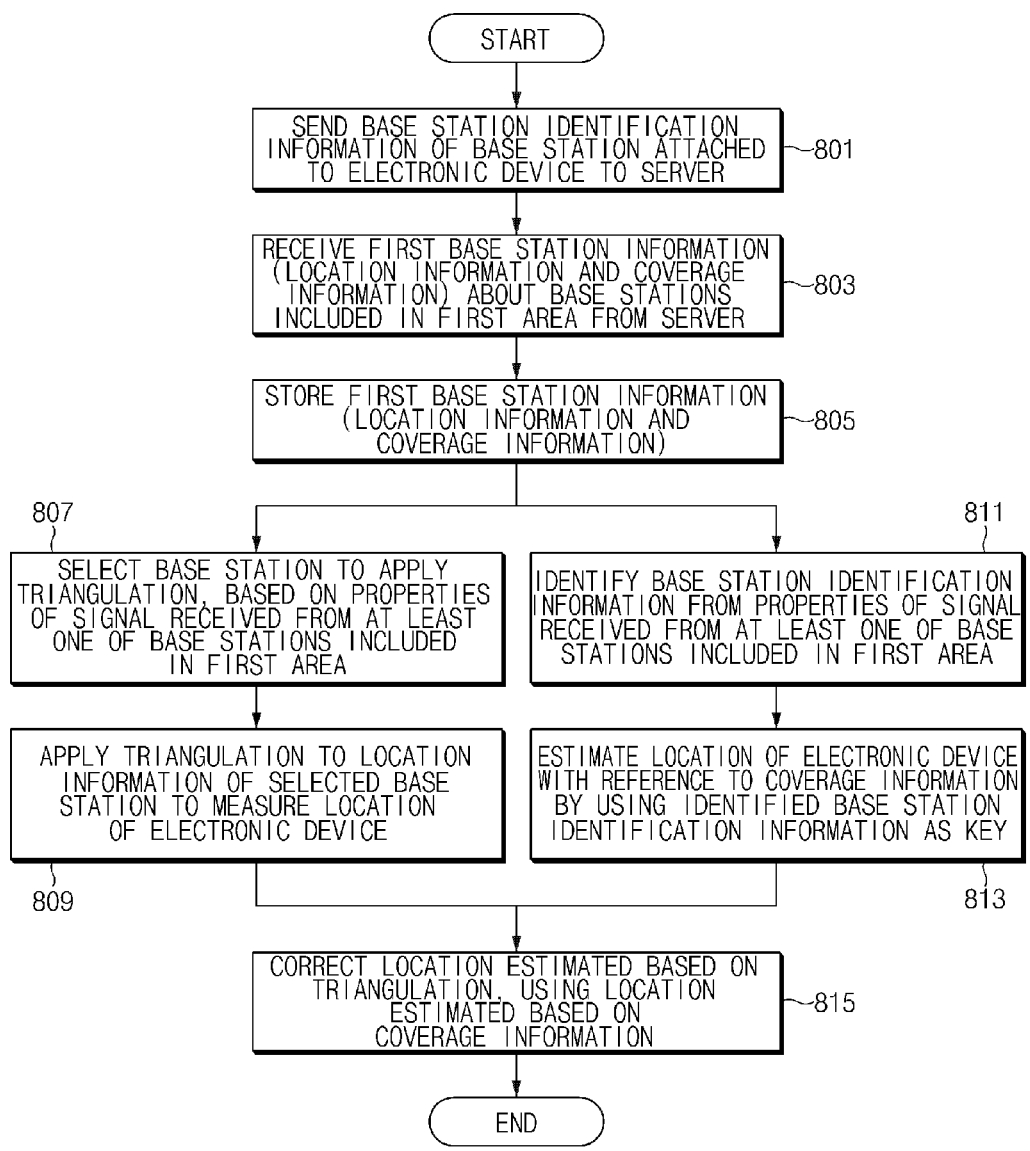
FIG. 8 illustrates a flowchart of a method for estimating a location of an electronic device according to another embodiment of the present disclosure.

FIG. 8 illustrates a flowchart of a method for estimating a location of an electronic device according to another embodiment of the present disclosure.

Referring to FIG. 8, the method for estimating the location of the electronic device according to an embodiment may include operations 801 to 815. Operations 801 to 815 may be performed by, for example, an electronic device 101 shown in FIG. 6. Each of operations 801 to 815 may be implemented with instructions which may be performed (or executed) by a processor 170 of the electronic device 101. The instructions may be stored in, for example, a computer storage medium or a memory 130 of the electronic device 101. Hereinafter, reference numerals of FIG. 6 are used for describing operations 801 to 815. A description partially repeated in connection with each of operations of FIG. 7A will be omitted below.

In operation 801, the processor 170 may send base station identification information of a base station (a serving base station) attached to the electronic device 101 via a communication circuit 160 to a server 106.

In operation 803, the processor 170 may receive first base station information (patch data of a first area) about base stations included in the first area on the serving base station from the server 106. The first base information (the patch data of the first area) may include location information of each of the base stations included in the first area and/or coverage information of the base stations included in the first area.

In operation 805, the processor 170 may store the first base station information (the patch of the first area) received in operation 803 in the memory 130.

In operation 807, the processor 170 may select a base stations to apply triangulation among at least one of base stations included in the first area based on properties of a signal received from the at least one base stations.

In operation 809, the processor 170 may apply the triangulation to location information of the selected base stations to estimate a location of the electronic device 101. The location information of the selected base station may be included in the first base station information stored in the memory 130 in operation 805.

In operation 811, the processor 170 may identify base station identification information of the at least one base station from the properties of the signal received from the at least one base station.

In operation 813, the processor 170 may estimate a location of the electronic device 101 with reference to coverage information by using the base station identification information identified in operation 811 as a key. The coverage information may be included in the first base station information stored in the memory 130 in operation 805.

In operation 815, the processor 170 may correct the location estimated in operation 809, using the location estimated in operation 813. According to various embodiments, the processor 170 may correct the location estimated in operation 813, using the location estimated in operation 809.

Figure 9:
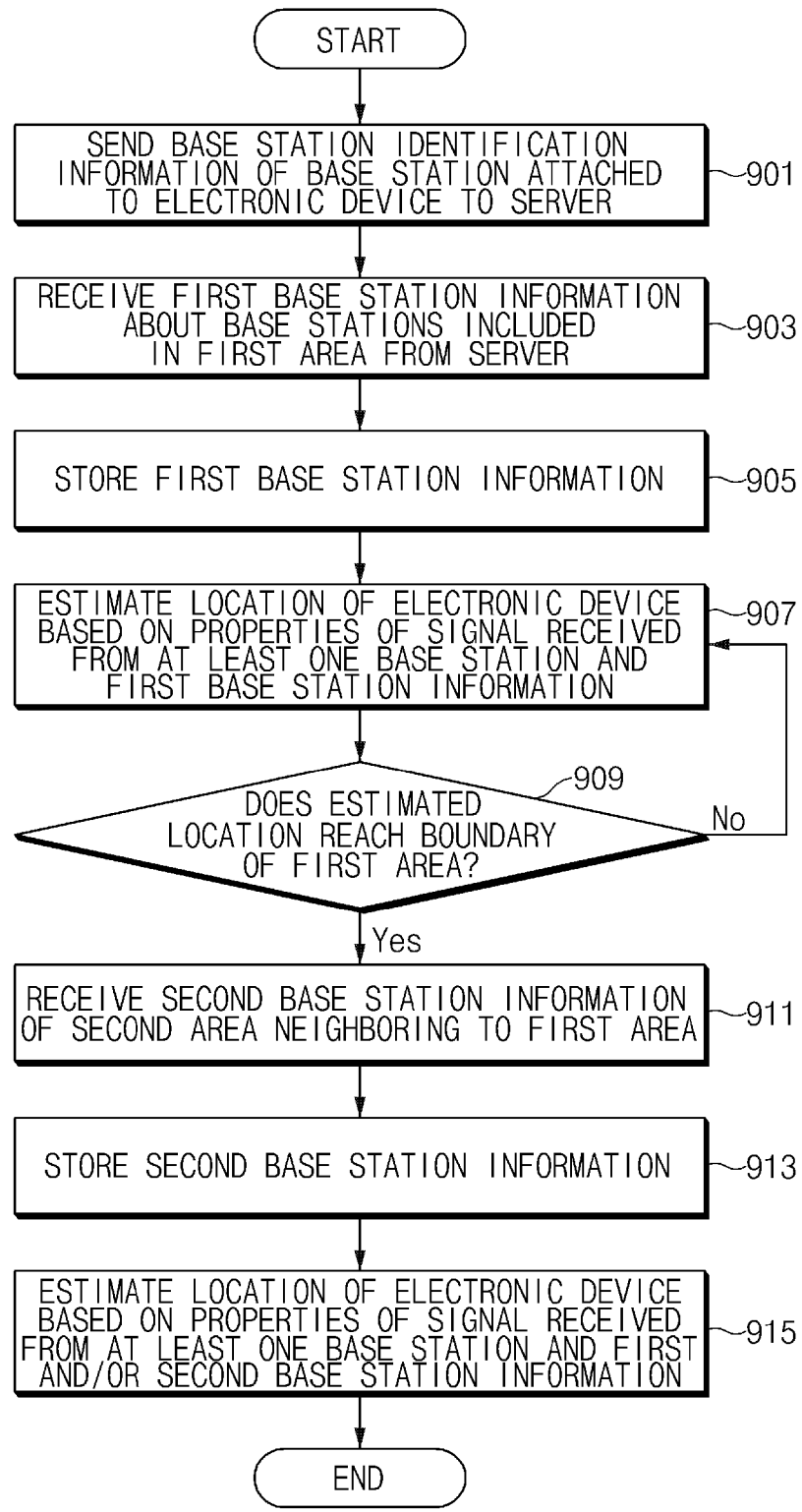
FIG. 9 illustrates a flowchart of a method for estimating a location of an electronic device while the electronic device is moved, according to another embodiment of the present disclosure.

FIG. 9 illustrates a flowchart of a method for estimating a location of an electronic device while the electronic device is moved, according to another embodiment of the present disclosure.

Referring to FIG. 9, the method for estimating the location of the electronic device according to an embodiment may include operations 901 to 915. Operations 901 to 915 may be performed by, for example, an electronic device 101 shown in FIG. 6. Each of operations 901 to 915 may be implemented with instructions which may be performed (or executed) by a processor 170 of the electronic device 101. The instructions may be stored in, for example, a computer storage medium or a memory 130 of the electronic device 101. Hereinafter, reference numerals of FIG. 6 are used for describing operations 901 to 915. A description partially repeated in connection with each of operations of FIGS. 7A and 8 will be omitted below.

In operation 901, the processor 170 may send base station identification information of a base station (a serving base station) attached to the electronic device 101 via a communication circuit 160 to a server 106.

In operation 903, the processor 170 may receive first base station information (patch data of a first area) about base stations included in a first area on the serving base station from the server 106.

In operation 905, the processor 170 may store the first base station information (the patch data of the first area) received in operation 903 in the memory 130.

In operation 907, the processor 170 may estimate a location of the electronic device 101 based on properties of a signal received from at least one of the base stations included in the first area and the first base station information (the patch data of the first area) stored in the memory 130.

In operation 909, the processor 170 may determine whether the location estimated in operation 907 reaches a boundary of the first area. If the estimated location reaches the boundary of the first area, the processor 170 may proceed with operation 909. If the location does not reach the boundary of the first area, the processor 170 may repeat the operation from operation 907.

In operation 911, the processor 170 may receive patch data of a second region neighboring to the first area, that is, second base station information about base stations included in the second area from the server 106.

A size of the second area may be the same or different from a size of the first area. According to an embodiment, the size of the second area may be determined based on a speed of the electronic device 101. Meanwhile, according to another embodiment, a portion repeated with the first base station information (patch data) in the second base station information (patch data) of the second area may fail to be received.

In operation 913, the processor 170 may store the second base station information (the patch data of the second area) received in operation 911 in the memory 130.

In operation 915, the processor 170 may estimate a location of the electronic device 101 based on properties of a signal received from at least one of the base stations included in the first area and/or the second area and the first base station information (the patch data of the first area) and/or the second base station information (the patch data of the second area), stored in the memory 130.

According to various embodiments, if a base station attached to the electronic device 101 is handed over to another base station, the processor 170 may receive new base station information (patch data) from the server 106 and may estimate a location of the electronic device 101 based on the received new base station information (patch data).

For example, if the base station attached to the electronic device 101 is handed over to another base station, the processor 170 may send base station identification information of the other base station to the server 160. The server 160 may send third base station information (patch data) about base stations included in a third area on the other base station to the electronic device 101 in response to receiving the base station identification information of the other base station.

Figure 10:
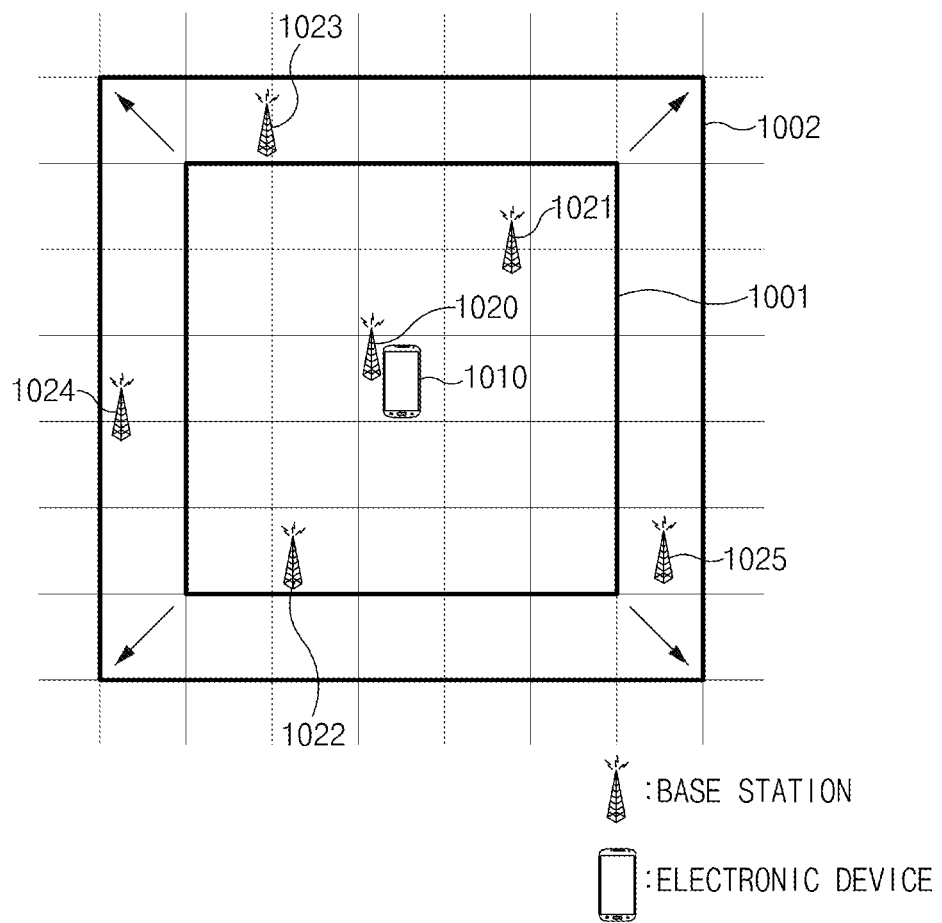
FIG. 10 illustrates patch data according to an embodiment of the present disclosure.

FIG. 10 illustrates patch data according to an embodiment of the present disclosure.

Referring to FIG. 10, an electronic device 1010 may be arranged in one grid virtually formed on the surface of the earth. According to an embodiment, the electronic device 1010 may send base station identification information of a serving base station (e.g., a base station 1020) to a server. The server may send first base station information (patch data) for a first area 1001 on a location of the serving base station to the electronic device 1010 in response to receiving the base station identification information of the serving base station 1020. The first area may be configured with, for example, 5*5 (25) unit path areas. The first base station information (patch data) of the first area 1001 may include location and coverage information of base stations 1020, 1021, and 1022 included in the first area 1001.

According to an embodiment, the first base station information included in the first area 1001 may be insufficient to estimate a location of the electronic device 1010. For example, it may be difficult for the electronic device 1010 to estimate a location of the electronic device 1010 based on the number of the base stations 1020, 1021, and 1022 included in the first area 1001 or signal strength of each of the base stations 1020, 1021, and 1022.

In this case, the electronic device 1010 may send a message for requesting to send additional base station information to the server. The server may send base station information (patch data) for an area 1002 expanded from the first area 1001 to the electronic device 1010 in response to receiving the message.

The expanded area 1002 may be configured with, for example, 7*7 (49) unit path areas. Base station information (patch data) of the expanded area 1002 may include location information and coverage information of base stations 1020 to 1025 included in the expanded area 1002.

According to various embodiments, the server may send base station information in which the previously provided first base station information of the first area 1001 is excepted from the base station (patch data) for the expanded area 1002. Thus, the server may send only base station information of the base stations 1023 and 1024 included in an area where the first area 1001 is excepted from the expanded area 1002 to the electronic device 1010.

The electronic device 1010 may estimate a location of the electronic device 1010 based on base station information about the base stations 1020 to 1025 included in the expanded area 1002.

Figure 11:
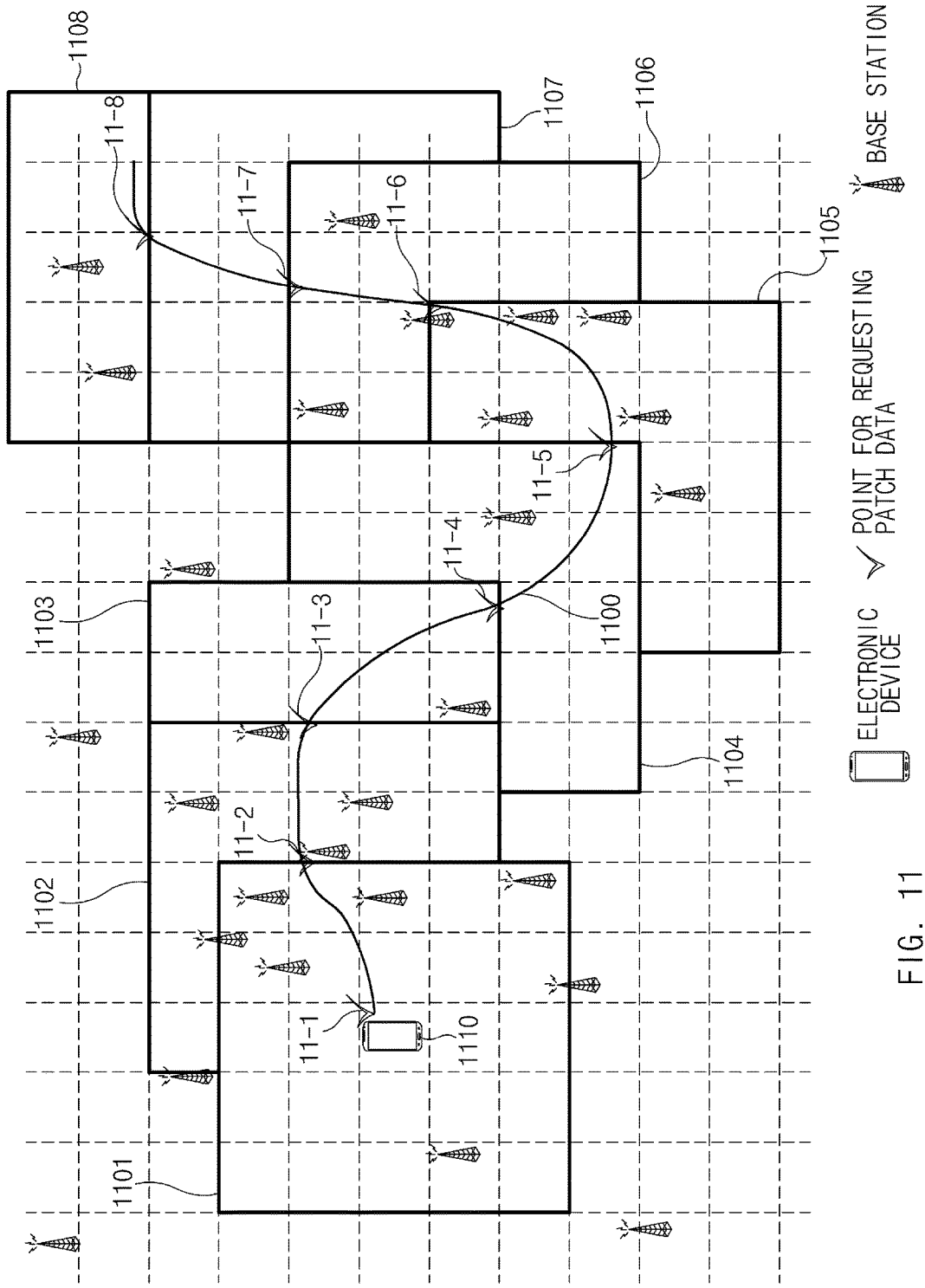
FIG. 11 illustrates an operation of updating patch data according to an embodiment of the present disclosure.

FIG. 11 illustrates an operation of updating patch data according to an embodiment of the present disclosure.

Referring to FIG. 11, an electronic device 1110 may move along a path 1100. While being moved, the electronic device 1110 may determine the electronic device's location based on base station information (patch data) received from a server.

For example, the electronic device 1110 may send identification information of a serving base station to the server at location 11-1 and may receive base station information (patch data of a first area 1101) of base stations included in the first area 1101 from the server in response to the identification information of the serving base station. The electronic device 1110 may determine the electronic device's location based on the patch data about the first area 1101.

According to an embodiment, the electronic device 1110 may move along the path 1100 and may reach a boundary (location 11-2) of the first area 1101. The electronic device 1110 may receive base station information (path data of a second area 1102) for base stations included in the second area 1102 neighboring to the first area 1101 from the server. For example, the electronic device 1110 may obtain base station information associated with the second area 1102 by sending the estimated location information or location information of the closest base station from the electronic device 1110 to the server.

Similarly, the electronic device 1110 may perform the operation performed at location 11-2 at locations 11-3 to 11-8. Therefore, the electronic device 1110 may receive base station information (e.g., patch data of the first area 1101 to patch data of an 8th area 1108) eight times from the server until the electronic device 1110 reaches the location 11-8 and may receive base station information about 119 unit patch areas (e.g., patch data of the first area 1101 to patch data of an 8th area 1108) eight times from the server.

Figure 12:
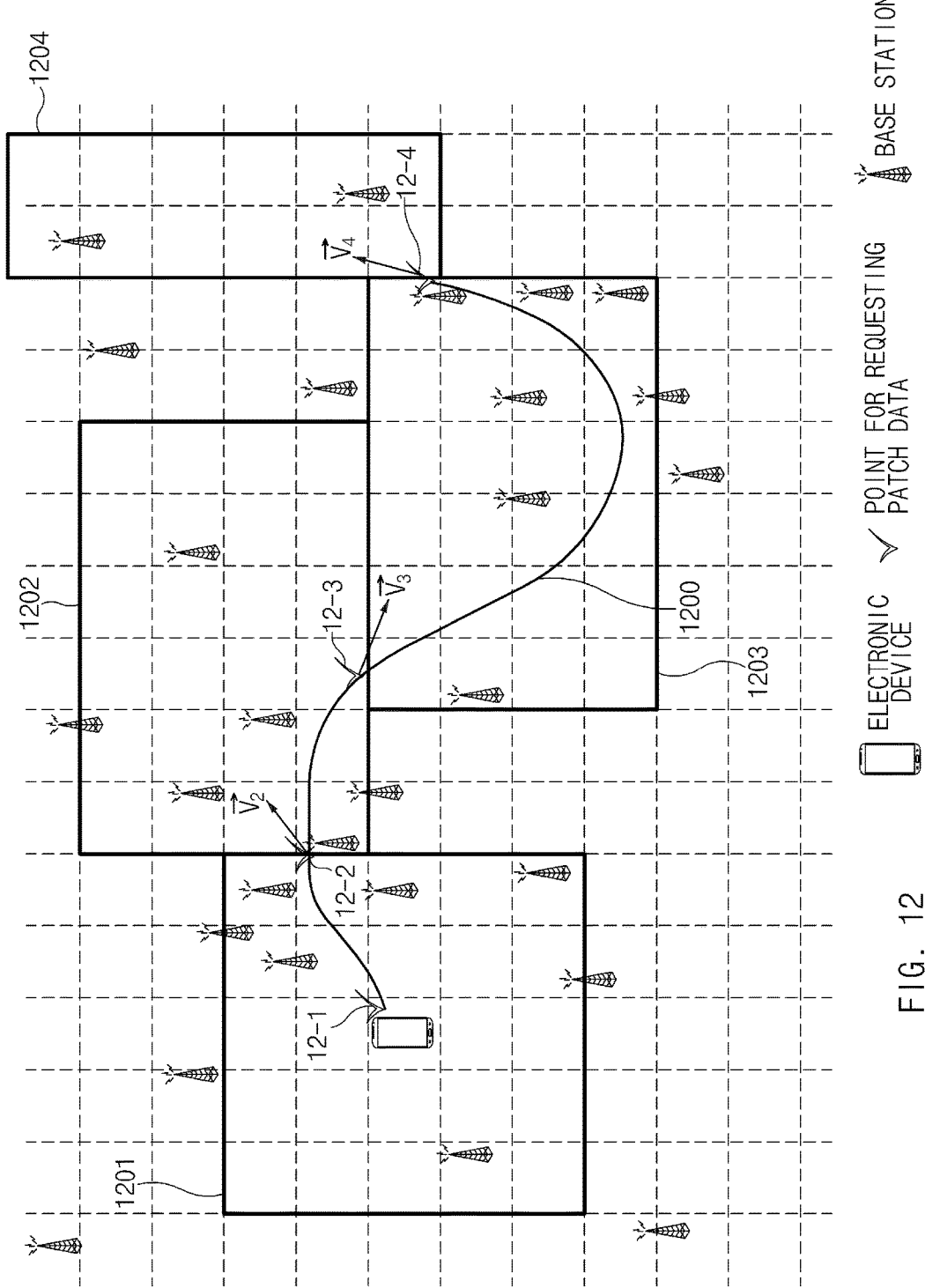
FIG. 12 illustrates an operation of updating patch data according to another embodiment of the present disclosure.

FIG. 12 illustrates an operation of updating patch data according to another embodiment of the present disclosure.

Referring to FIG. 12, an electronic device 1210 may move along a path 1200. While being moved, the electronic device 1210 may determine the electronic device's location based on base station information (patch data) received from a server.

For example, the electronic device 1210 may send identification information of a serving base station to the server at location 12-1 and may receive base station information (patch data of a first area 1201) of base stations included in the first area 1201 from the server in response to the identification information of the serving base station. The electronic device 1210 may determine the electronic device's location based on patch data about the first area 1201.

According to an embodiment, the electronic device 1210 may move along the path 1200 and may reach a boundary (location 12-2) of the first area 1201. The electronic device 1210 may move northeast at a speed V2 at location 12-2.

The electronic device 1210 may receive base station information (patch data of a second area 1202) for base stations included in the second area 1202 at location 12-2 from the server. In this case, the second area 1202 may be determined in size based on the speed V2.

For example, the electronic device 1210 may provide the estimated location and time information at the estimated location to the server at a specified period. The server may calculate a speed of the electronic device 1210 based on the location and the time information of the electronic device 1210 and may use the calculated speed to for determine determining an area of base station information (patch data) to be provided for the electronic device 1210.

Similarly, the electronic device 1210 may perform the operation performed at the location 12-2 at locations 12-3 and 12-4. Therefore, the electronic device 1210 may receive base station information (e.g., patch data of the first area 1201 to patch data of a 4th area 1204) four times from the server until it reaches location 12-4 and may receive base station information about 97 unit patch areas from the server.

Figure 13:
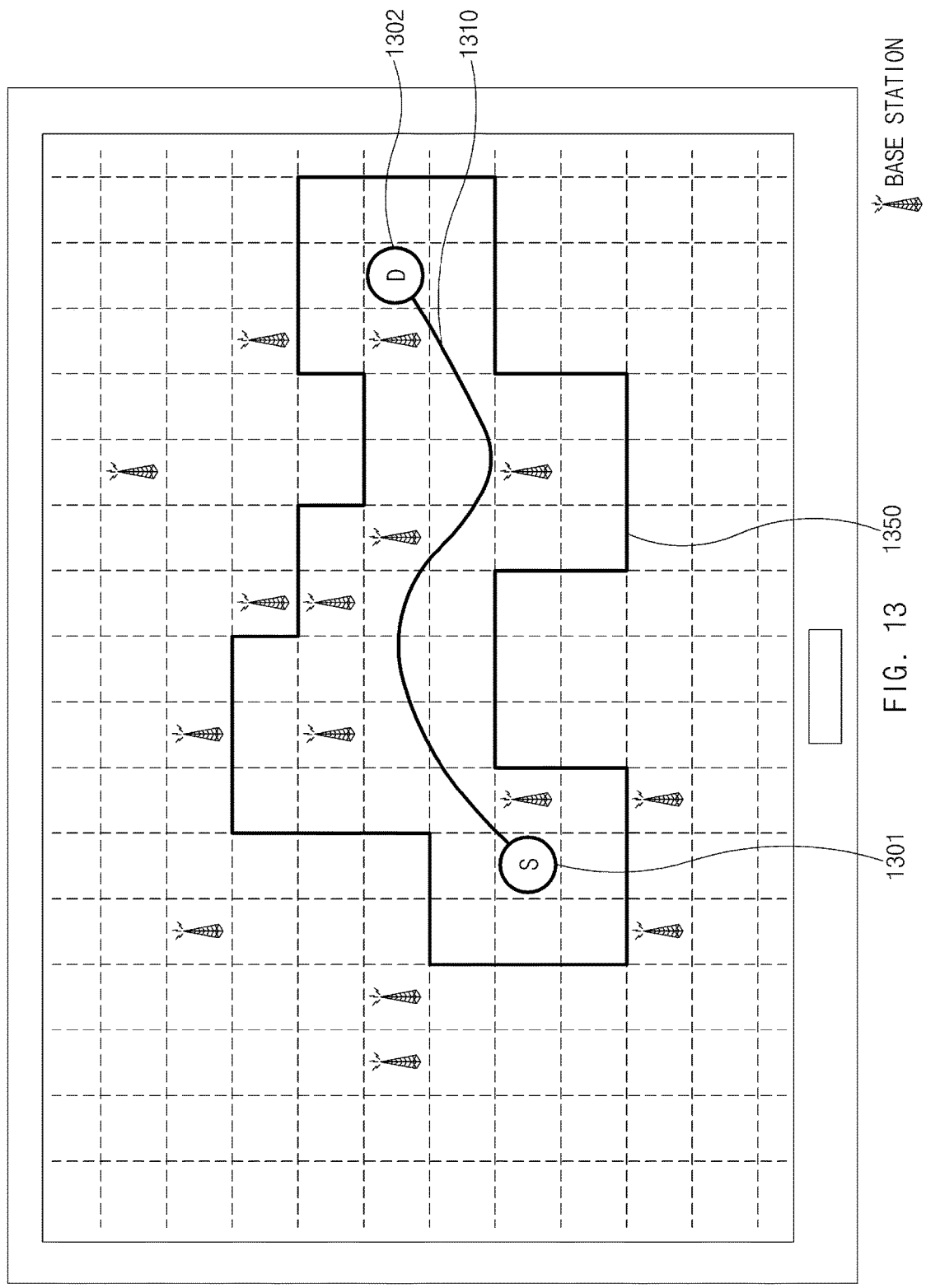
FIG. 13 illustrates an operation of obtaining patch data in an electronic device according to an embodiment of the present disclosure.

FIG. 13 illustrates an operation of obtaining patch data in an electronic device according to an embodiment of the present disclosure.

Referring to FIG. 13, an electronic device 1300 which executes a navigation application is shown. According to an embodiment, a user of the electronic device 1300 may set a source 1301 and/or a destination 1302 through a user interface (UI) screen by the navigation application. If the source 1301 and/or the destination 1302 is set, the electronic device 1300 may search for a path 1310 from the source 1310 to the destination 1302 based on execution of the navigation application.

If the path 1310 is determined, the electronic device 1300 may specify a nearby area 1350 of the path 1310. The electronic device 1300 may request a server to send patch data (base station information) of a base station (a so-called effective base station) having a signal quality factor (or signal quality) of a threshold value or more among base stations arranged in the nearby area 1350 and may receive the patch data (base station) from the server.

Figure 14:
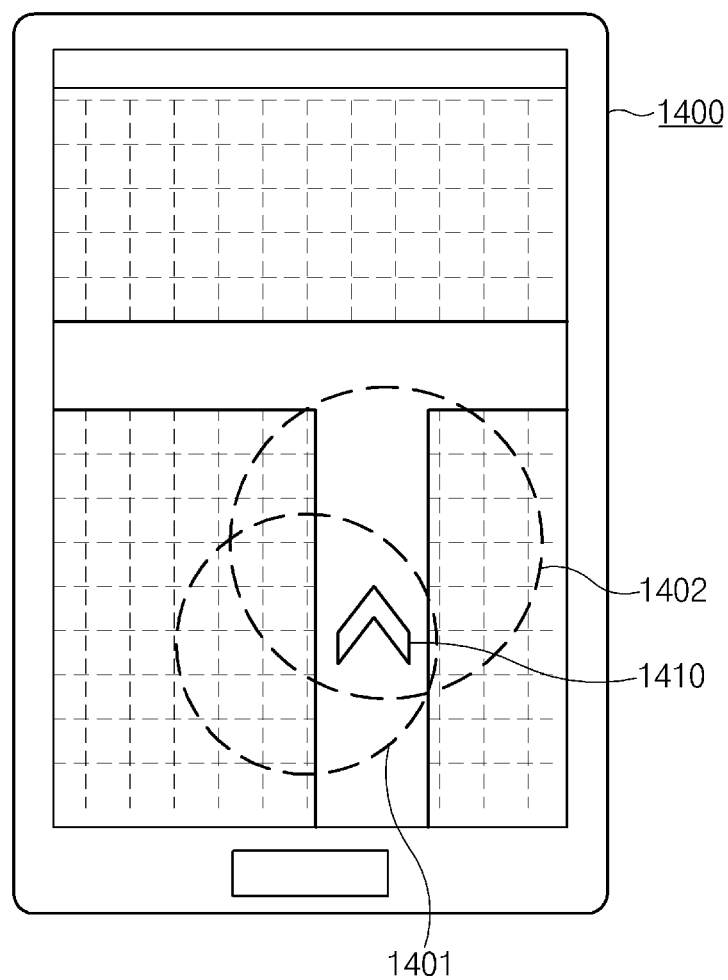
FIG. 14 illustrates an electronic device to a location estimation method is applied, according to an embodiment of the present disclosure.

FIG. 14 illustrates an electronic device to a location estimation method is applied, according to an embodiment of the present disclosure.

Referring to FIG. 14, an electronic device 1400 which executes a navigation application is shown. A location estimation method according to an embodiment may be applied to the electronic device 1400. (A user of) the electronic device 1400 may move along a path for reaching a destination.

According to an embodiment, the electronic device 1400 may display information about a serving base station currently attached to the electronic device 1400 and/or information about a neighboring base station on a UI screen of the navigation application. For example, the electronic device 1400 may distinctively display the serving base station and the neighboring base station on the UI screen of the navigation application and may display strength of a signal received from the serving base station, patch data coverage of the corresponding base station, or the like on the UI screen of the navigation application. For example, the electronic device 1400 may display a UI object 1410 indicating the electronic device's current location/movement direction and may display patch data coverage 1401 of the serving base station and patch data coverage 1402 of the neighboring base station.

As described above, according to various embodiments, the electronic device may store base station information (or patch data) provided from the server in the electronic device's memory and may estimate the electronic device's location using information stored in the memory. The electronic device may estimate the electronic device's location without using a GNSS circuit (e.g., a GPS circuit), thus reducing power consumed by driving the GNSS circuit. Also, if previously receiving base station from the server, the electronic device may ascertain the electronic device's location although it does not communicate data with the external device.

Further, according to various embodiments, compared with a location estimation method using conventional triangulation, since the electronic device uses a base station signal of a mobile communication service provider to which the corresponding electronic device does not subscribe, it may provide a uniform location estimation service irrespective of whether it subscribes to any communication service provider.

Further, since the base station information (or the patch data) may be configured based on information received through crowdsourcing from a plurality of electronic devices, the electronic device may increase reliability of the base station (or the patch data) and may update the base station (or the patch data) in real time.

According to an embodiment, an electronic device may include a memory, a communication circuit, and a processor configured to operatively connect with the memory and the communication circuit. The processor may be configured to send base station identification information of a base station attached to the electronic device via the communication circuit, receive first base station information about base stations included in a first area on the base station from the server, store the first base station information in the memory, and estimate a location of the electronic device based on properties of a signal received from at least one of the base stations included in the first area and the first base station information.

In the electronic device according to another embodiment, the first base station information may include at least one of location information of each of the base stations included in the first area or coverage information of the base stations included in the first area.

In the electronic device according to another embodiment, the coverage information may include location information in which one or more of signals transmitted from the base stations included in the first area are detected.

In the electronic device according to another embodiment, the processor may be configured to select a base station to apply triangulation among the at least one base station based on the properties of the signal received from the at least one base station and estimate the location of the electronic device by applying the triangulation to location information of the selected base station.

In the electronic device according to another embodiment, the processor may be configured to identify base station identification information of the at least one base station from the properties of the signal received from the at least one base station and estimate the location of the electronic device with reference to the coverage information by using the identified base station identification information as a key.

In the electronic device according to another embodiment, the processor may be configured to correct the location estimated based on the triangulation, using location information estimated based on the coverage information.

In the electronic device according to another embodiment, the processor may be configured to receive second base station information about base stations included in a second area neighboring to the first area from the server if the estimated location reaches a boundary of the first area.

In the electronic device according to another embodiment, the second area may be configured to be determined in size based on a speed of the electronic device.

In the electronic device according to another embodiment, the speed of the electronic device may be derived from the estimated location and time information at the estimated location.

In the electronic device according to another embodiment, the processor may be configured to send base station identification information of another base station to the server if the base station attached to the electronic device is handed over to the other base station and receive third base station information about base stations included in a third area on the other base station from the server.

In the electronic device according to another embodiment, the memory may have a specific security policy may be applied to the memory.

In the electronic device according to another embodiment, the memory may be implemented to be included in the processor.

According to an embodiment, a method for estimating a location of an electronic device may include sending base station identification information of a base station attached to the electronic device, receiving first base station information about base stations included in a first area on the base station from the server, storing the first base station information in the memory, and estimating a location of the electronic device based on properties of a signal received from at least one of the base stations included in the first area and the first base station information.

In the method according to another embodiment, the first base station information may include at least one of location information of each of the base stations included in the first area or coverage information of the base stations included in the first area.

In the method according to another embodiment, the method may further include selecting a base station to apply triangulation among the at least one base station based on the properties of the signal received from the at least one base station. The estimating of the location of the electronic device may include estimating the location of the electronic device by applying the triangulation to location information of the selected base station.

In the method according to another embodiment, the method may further include identifying base station identification information of the at least one base station from the properties of the signal received from the at least one base station. The estimating of the location of the electronic device may include estimating the location of the electronic device with reference to the coverage information by using the identified base station identification information as a key.

In the method according to another embodiment, the method may further include correcting the location estimated based on the triangulation, using a location estimated based on the coverage information.

In the method according to another embodiment, the method may further include receiving second base station information about base stations included in a second area neighboring to the first area from the server if the estimated location reaches a boundary of the first area.

In the method according to another embodiment, the second area may be configured to be determined in size based on a speed of the electronic device.

In the method according to another embodiment, the method may further include sending base station identification information of another base station to the server if the base station attached to the electronic device is handed over to the other base station and receiving third base station information about base stations included in a third area on the other base station from the server.

According to an embodiment, a computer-readable storage medium may store instructions executed by at least one processor. The instructions may be configured to send base station identification information of a base station attached to the electronic device, receive first base station information about base stations included in a first area on the base station from the server, store the first base station information in the electronic device, and estimate a location of the electronic device based on properties of a signal received from at least one of the base stations included in the first area and the first base station information.

According to an embodiment, an electronic device may include a memory configured to store base station information corresponding to at least one base station, a communication circuit, and a processor. The processor may be configured to verify status information associated with the electronic device, send the status information to an external electronic device using the communication circuit, receive updated base station information for at least part of the base station information, dynamically determined based on the at least status information, or another base station information corresponding to another base station from the external electronic device, and provide location information of the electronic device based on the at least updated base station information or the at least other base station information.

In the electronic device according to another embodiment, the processor may be configured to receive first base station information as at least part of the updated base station information or the other base station information if the status information meets a first specified condition and receive second base station information as at least part of the updated base station information or the other base station information if the status information meets a second specified condition.

In the electronic device according to another embodiment, the processor may be configured to receive information corresponding to a first base station set among the at least one base station or the other base station as at least part of the first base station information and receive information corresponding to a second base station set among the at least one base station or the other base station as at least part of the second base station information.

In the electronic device according to another embodiment, the processor may be configured to verify base station density information corresponding to the at least one base station or the other base station based on the at least updated base station information or the at least other base station information and delete at least part of the updated base station information or the other base station information from the memory based on the at least base station density information.

In the electronic device according to another embodiment, the processor may be configured to verify location information of the electronic device, a movement speed of the electronic device, a size of the memory, a combination thereof as at least part of the status information.

Figure 15:
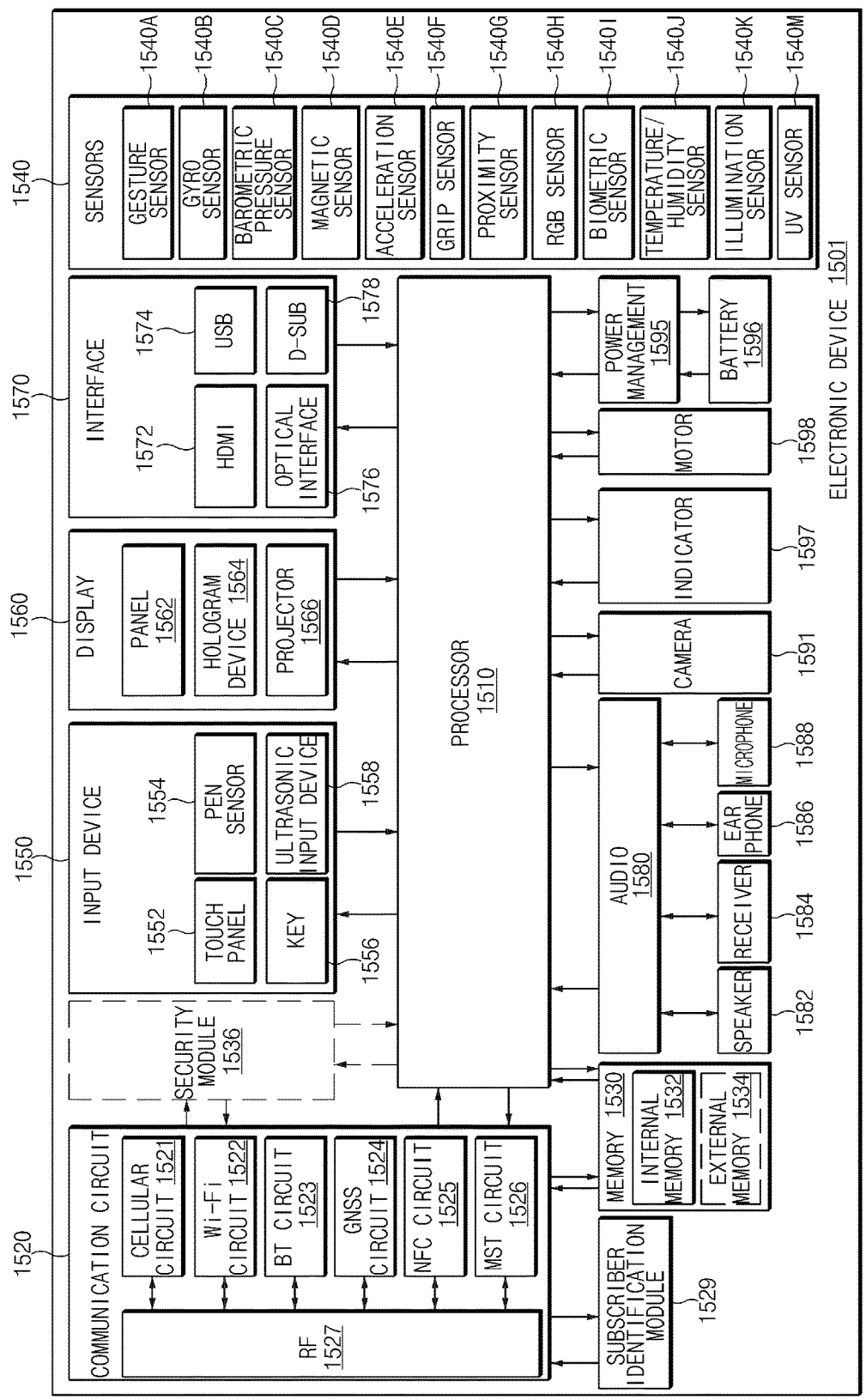
FIG. 15 illustrates a configuration of an electronic device according to various embodiments of the present disclosure.

FIG. 15 illustrates a configuration of an electronic device according to various embodiments of the present disclosure.

Referring to FIG. 15, an electronic device 1501 may include, for example, all or part of an electronic device 101 shown in FIG. 6. The electronic device 1501 may include one or more processors 1510 (e.g., application processors (APs)), a communication circuit 1520, a subscriber identification module (SIM) 1529, a memory 1530, a secure circuit 1536, a sensor 1540, an input device 1550, a display 1560, an interface 1570, an audio 1580, a camera 1591, a power management 1595, a battery 1596, an indicator 1597, and a motor 1598.

The processor 1510 may execute, for example, an operating system (OS) or an application program to control a plurality of hardware or software components connected thereto and may process and compute a variety of data. The processor 1510 may be implemented with, for example, a system on chip (SoC). According to an embodiment, the processor 1510 may include a graphic processing unit (GPU) (not shown) and/or an image signal processor (not shown). The processor 1510 may include at least some (e.g., a Cellular circuit 1521) of the components shown in FIG. 15. The processor 1510 may load a command or data, received from at least one of other components (e.g., a non-volatile memory), to a volatile memory to process the data and may store various data in a non-volatile memory.

The communication circuit 1520 may have the same or similar configuration to a communication circuit 160 of FIG. 6. The communication circuit 1520 may include, for example, the Cellular circuit 1521, a wireless-fidelity (Wi-Fi) circuit 1522, a Bluetooth (BT) circuit 1523, a global navigation satellite system (GNSS) circuit 1524 (e.g., a GPS circuit, a Glonass circuit, a Beidou circuit, or a Galileo circuit), a near field communication (NFC) circuit 1525, an MST circuit 1526, and a radio frequency (RF) 1527.

The Cellular circuit 1521 may provide, for example, a voice call service, a video call service, a text message service, or an Internet service, and the like over a communication network. According to an embodiment, the cellular circuit 1521 may identify and authenticate the electronic device 1501 in a communication network using the SIM 1529 (e.g., a SIM card). According to an embodiment, the cellular circuit 1521 may perform at least some of functions which may be provided by the processor 1510. According to an embodiment, the Cellular circuit 1521 may include a communication processor (CP).

The Wi-Fi circuit 1522, the BT circuit 1523, the GNSS circuit 1524, the NFC circuit 1525, or the MST circuit 1526 may include, for example, a processor for processing data communicated through the corresponding circuit. According to various embodiments, at least some (e.g., two or more) of the Cellular circuit 1521, the Wi-Fi circuit 1522, the BT circuit 1523, the GNSS circuit 1524, the NFC circuit 1525, or the MST circuit 1526 may be included in one integrated chip (IC) or one IC package.

The RF 1527 may communicate, for example, a communication signal (e.g., an RF signal). Though not shown, the RF 1527 may include, for example, a transceiver, a power amplifier module (PAM), a frequency filter, or a low noise amplifier (LNA), or an antenna, and the like. According to another embodiment, at least one of the cellular circuit 1521, the Wi-Fi circuit 1522, the BT circuit 1523, the GNSS circuit 1524, the NFC circuit 1525, or the MST circuit 1526 may communicate an RF signal through a separate RF.

The SIM 1529 may include, for example, a card which includes a SIM and/or an embedded SIM. The SIM 1529 may include unique identification information (e.g., an integrated circuit card identifier (ICCID)) or subscriber information (e.g., an international mobile subscriber identity (IMSI)).

The memory 1530 (e.g., a memory 130 of FIG. 6) may include, for example, an embedded memory 1532 or an external memory 1534. The embedded memory 1532 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 1534 may include a flash drive, for example, a compact flash (CF), a secure digital (SD), a micro-SD, a mini-SD, an extreme digital (xD), a multimedia card (MMC), or a memory stick, and the like. The external memory 1534 may operatively and/or physically connect with the electronic device 1501 through various interfaces.

The secure circuit 1536 may be a circuit which has a relatively higher secure level than the memory 1530 and may be a circuit which stores secure data and guarantees a protected execution environment. The secure circuit 1536 may be implemented with a separate circuit and may include a separate processor. The secure circuit 1536 may include, for example, an embedded secure element (eSE) which is present in a removable smart chip or a removable SD card or is embedded in a fixed chip of the electronic device 1501. Also, the secure circuit 1536 may be driven by an OS different from the OS of the electronic device 1501. For example, the secure circuit 1536 may operate based on a java card open platform (JCOP) OS.

The sensor 1540 may measure, for example, a physical quantity or may detect an operation state of the electronic device 1501, and may convert the measured or detected information to an electric signal. The sensor 1540 may include at least one of, for example, a gesture sensor 1540A, a gyro sensor 1540B, a barometric pressure sensor 1540C, a magnetic sensor 1540D, an acceleration sensor 1540E, a grip sensor 1540F, a proximity sensor 1540G, a color sensor 1540H (e.g., red, green, blue (RGB) sensor), a biometric sensor 1540I, a temperature/humidity sensor 1540J, an illumination sensor 1540K, or an ultraviolet (UV) sensor 1540M. Additionally or alternatively, the sensor 1540 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor 1540 may further include a control circuit for controlling at least one or more sensors included therein. In various embodiments, the electronic device 1501 may further include a processor configured to control the sensor 1540, as part of the processor 1510 or to be independent of the processor 1510. While the processor 1510 is in a sleep state, the electronic device 1501 may control the sensor 1540.

The input device 1550 may include, for example, a touch panel 1552, a (digital) pen sensor 1554, a key 1556, or an ultrasonic input unit 1558. The touch panel 1552 may use, for example, at least one of a capacitive type, a resistive type, an infrared type, or an ultrasonic type. Also, the touch panel 1552 may include a control circuit. The touch panel 1552 may further include a tactile layer and may provide a tactile reaction to a user.

The (digital) pen sensor 1554 may be, for example, part of the touch panel 1552 or may include a separate sheet for recognition. The key 1556 may include, for example, a physical button, an optical key, or a keypad. The ultrasonic input unit 1558 may allow the electronic device 1501 to detect an ultrasonic wave generated by an input tool, through a microphone (e.g., a microphone 1588) and to verify data corresponding to the detected ultrasonic wave.

The display 1560 (e.g., a display 120 of FIG. 6) may include a panel 1562, a hologram device 1564, or a projector 1566. The panel 1562 may include the same or similar configuration to the display 120. The panel 1562 may be implemented to be, for example, flexible, transparent, or wearable. The panel 1562 and the touch panel 1552 may be integrated into one circuit. According to an embodiment, the touch panel 1552 may include a pressure sensor (or a force sensor interchangeably used hereinafter) which may measure intensity of pressure on a touch of a user. The pressure sensor may be integrated with the touch panel 1552 or may be implemented with one or more sensors independent of the touch panel 1552. The hologram device 1564 may show a stereoscopic image in a space using interference of light. The projector 1566 may project light onto a screen to display an image. The screen may be positioned, for example, inside or outside the electronic device 1501. According to an embodiment, the display 1560 may further include a control circuit for controlling the panel 1562, the hologram device 1564, or the projector 1566.

The interface 1570 may include, for example, a high-definition multimedia interface (HDMI) 1572, a universal serial bus (USB) 1574, an optical interface 1576, or a D-subminiature 1578. The interface 1570 may be included in, for example, a communication circuit 160 shown in FIG. 6. Additionally or alternatively, the interface 1570 may include, for example, a mobile high definition link (MHL) interface, an SD card/multimedia card (MMC) interface, or an infrared data association (IrDA) standard interface.

The audio 1580 may interchangeably convert a sound into an electric signal. At least some of components of the audio 1580 may be included in, for example, an I/O interface 150 shown in FIG. 6. The audio 1580 may process sound information input or output through, for example, a speaker 1582, a receiver 1584, an earphone 1586, or the microphone 1588, and the like.

The camera 1591 may be a device which captures a still image and a moving image. According to an embodiment, the camera 1591 may include one or more image sensors (not shown) (e.g., a front sensor or a rear sensor), a lens (not shown), an image signal processor (ISP) (not shown), or a flash (not shown) (e.g., an LED or a xenon lamp).

The power management 1595 may manage, for example, power of the electronic device 1501. According to an embodiment, though not shown, the power management 1595 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 1596 and voltage, current, or temperature thereof while the battery 1596 is charged. The battery 1596 may include, for example, a rechargeable battery or a solar battery.

The indicator 1597 may display a specific state of the electronic device 1501 or part (e.g., the processor 1510) thereof, for example, a booting state, a message state, or a charging state, and the like. The motor 1598 may convert an electric signal into mechanical vibration and may generate vibration or a haptic effect, and the like. Though not shown, the electronic device 1501 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a mediaFlo™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

Figure 16:
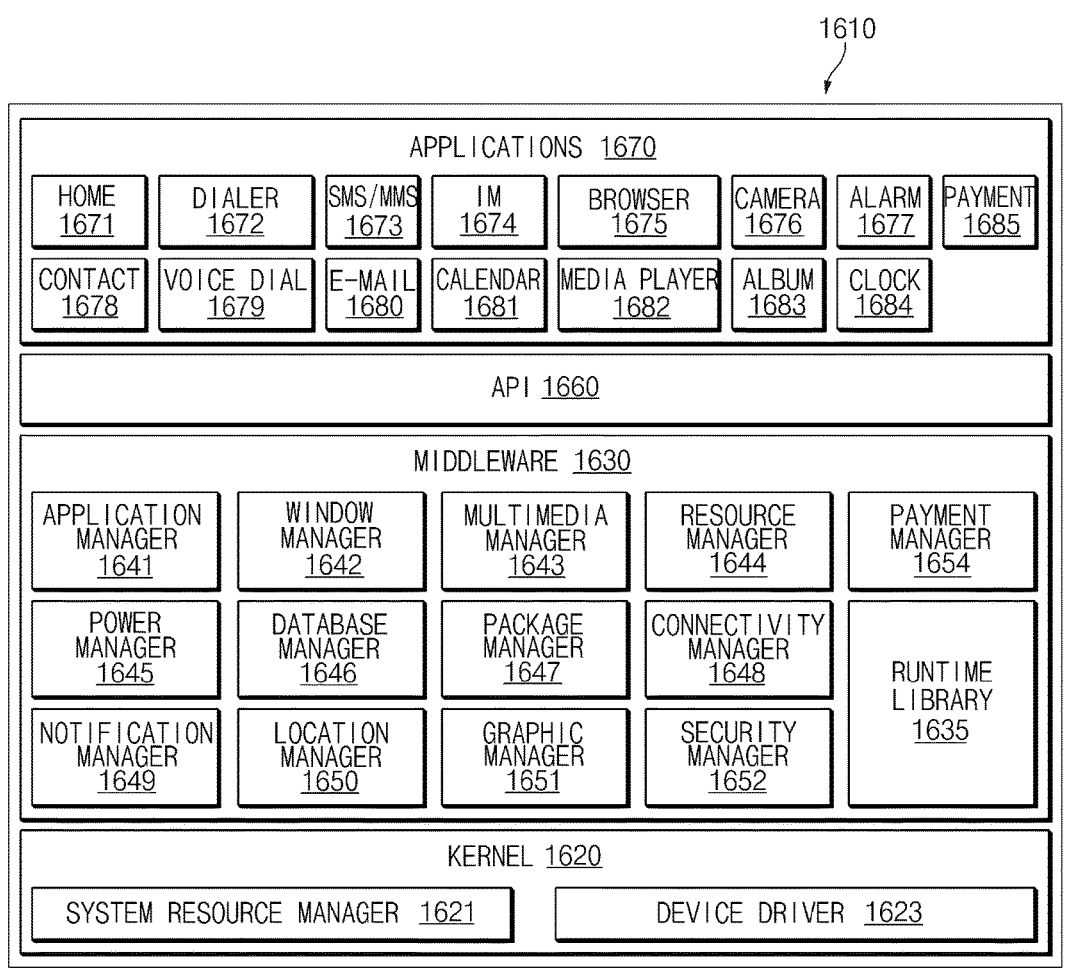
FIG. 16 illustrates a configuration of a program module according to various embodiments of the present disclosure.

FIG. 16 illustrates a configuration of a program module according to various embodiments of the present disclosure.

According to an embodiment, a program module 1610 (e.g., a program 140 of FIG. 6) may include an operating system (OS) for controlling resources associated with an electronic device (e.g., an electronic device 101 of FIG. 6) and/or various applications (e.g., at least one application program 147 of FIG. 6) which are executed on the OS. The OS may be, for example, Android™, iOS™, Windows™, Symbian™, Tizen™, or Bada™.

The program module 1610 may include a kernel 1620, a middleware 1630, an application programming interface (API) 1660, and/or at least one application 1670. At least part of the program module 1610 may be preloaded on the electronic device, or may be downloaded from an external electronic device (e.g., a first external electronic device 102, a second external electronic device 104, or a server 106, and the like of FIG. 6).

The kernel 1620 (e.g., a kernel 141 of FIG. 6) may include, for example, a system resource manager 1621 and/or a device driver 1623. The system resource manager 1621 may control, assign, or collect, and the like system resources. According to an embodiment, the system resource manager 1621 may include a process management unit, a memory management unit, or a file system management unit, and the like. The device driver 1623 may include, for example, a display driver, a camera driver, a Bluetooth (BT) driver, a shared memory driver, a universal serial bus (USB) driver, a keypad driver, a wireless-fidelity (Wi-Fi) driver, an audio driver, or an inter-process communication (IPC) driver.

The middleware 1630 (e.g., a middleware 143 of FIG. 6) may provide, for example, functions the application 1670 needs in common, and may provide various functions to the application 1670 through the API 1660 such that the application 1670 efficiently uses limited system resources in the electronic device. According to an embodiment, the middleware 1630 (e.g., the middleware 143) may include at least one of a runtime library 1635, an application manager 1641, a window manager 1642, a multimedia manager 1643, a resource manager 1644, a power manager 1645, a database manager 1646, a package manager 1647, a connectivity manager 1648, a notification manager 1649, a location manager 1650, a graphic manager 16351, a security manager 1652, or a payment manager 1654.

The runtime library 1635 may include, for example, a library module used by a compiler to add a new function through a programming language while the application 1670 is executed. The runtime library 1635 may perform a function about input and output management, memory management, or an arithmetic function.

The application manager 1641 may manage, for example, a life cycle of at least one of the at least one application 1670. The window manager 1642 may manage graphic user interface (GUI) resources used on a screen of the electronic device. The multimedia manager 1643 may ascertain a format necessary for reproducing various media files and may encode or decode a media file using a codec corresponding to the corresponding format. The resource manager 1644 may manage source codes of at least one of the at least one application 1670, and may manage resources of a memory or a storage space, and the like.

The power manager 1645 may act together with, for example, a basic input/output system (BIOS) and the like, may manage a battery or a power source, and may provide power information necessary for an operation of the electronic device. The database manager 1646 may generate, search, or change a database to be used in at least one of the at least one application 1670. The package manager 1647 may manage installation or update of an application distributed by a type of a package file.

The connectivity manager 1648 may manage, for example, wireless connection such as Wi-Fi connection or BT connection, and the like. The notification manager 1649 may display or notify events, such as an arrival message, an appointment, and proximity notification, by a method which is not disturbed to the user. The location manager 1650 may manage location information of the electronic device. The graphic manager 1651 may manage a graphic effect to be provided to the user or a user interface (UI) related to the graphic effect. The security manager 1652 may provide all security functions necessary for system security or user authentication, and the like. According to an embodiment, when the electronic device (e.g., the electronic device 101) has a phone function, the middleware 1630 may further include a telephony manager (not shown) for managing a voice or video communication function of the electronic device.

The middleware 1630 may include a middleware module which configures combinations of various functions of the above-described components. The middleware 1630 may provide a module which specializes according to kinds of OSs to provide a differentiated function. Also, the middleware 1630 may dynamically delete some of old components or may add new components.

The API 1660 (e.g., an API 145 of FIG. 6) may be, for example, a set of API programming functions, and may be provided with different components according to OSs. For example, in case of Android or iOS, one API set may be provided according to platforms. In case of Tizen, two or more API sets may be provided according to platforms.

The application 1670 (e.g., the application program 147) may include one or more of, for example, a home application 1671, a dialer application 1672, a short message service/multimedia message service (SMS/MMS) application 1673, an instant message (IM) application 1674, a browser application 1675, a camera application 1676, an alarm application 1677, a contact application 1678, a voice dial application 1679, an e-mail application 1680, a calendar application 1681, a media player application 1682, an album application 1683, a clock application 1684, a payment application 1685, a health care application (e.g., an application for measuring quantity of exercise or blood sugar, and the like), or an environment information application (e.g., an application for providing atmospheric pressure information, humidity information, or temperature information, and the like), and the like.

According to an embodiment, the application 1670 may include an application (hereinafter, for better understanding and ease of description, referred to as "information exchange application") for exchanging information between the electronic device (e.g., the electronic device 101) and an external electronic device (e.g., the first external electronic device 102 or the second external electronic device 104). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the first external electronic device 102 or the second external electronic device 104). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic device 102 or the second external electronic device 104) which communicates with the electronic device, an application which operates in the external electronic device, or a service (e.g., a call service or a message service) provided from the external electronic device.

According to an embodiment, the application 1670 may include an application (e.g., the health card application of a mobile medical device) which is preset according to attributes of the external electronic device (e.g., the first external electronic device 102 or the second external electronic device 104). According to an embodiment of the present disclosure, the application 1670 may include an application received from the external electronic device (e.g., the server 106, the first external electronic device 102, or the second external electronic device 104). According to an embodiment of the present disclosure, the application 1670 may include a preloaded application or a third party application which may be downloaded from a server. Names of the components of the program module 1610 according to various embodiments of the present disclosure may differ according to kinds of OSs.

According to various embodiments, at least part of the program module 1610 may be implemented with software, firmware, hardware, or at least two or more combinations thereof. At least part of the program module 1610 may be implemented (e.g., executed) by, for example, a processor (e.g., a processor 1510 of FIG. 15). At least part of the program module 1610 may include, for example, a module, a program, a routine, sets of instructions, or a process, and the like for performing one or more functions.

The terminology "module" used herein may mean, for example, a unit including one of hardware, software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

According to various embodiments, at least part of a device (e.g., modules or the functions) or a method (e.g., operations) may be implemented with, for example, instructions stored in computer-readable storage media which have a program module. When the instructions are executed by a processor (e.g., a processor 170 of FIG. 6), one or more processors may perform functions corresponding to the instructions. The computer-readable storage media may be, for example, a memory 130 of FIG. 6.

The computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

Modules or program modules according to various embodiments may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

As described above, according to various embodiments, the electronic device may store base station information (or patch data) provided from the server in the electronic device's memory and may estimate the electronic device's location using information stored in the memory. The electronic device may estimate the electronic device's location without using a GNSS circuit, thus reducing power consumed by driving the GNSS circuit. Also, if previously receiving base station information from the server, the electronic device may ascertain the electronic device's location although it does not communicate data with the external device.

Further, according to various embodiments, compared with a location estimation method using conventional triangulation, since the electronic device uses a base station signal of a mobile communication service provider to which the corresponding electronic device does not subscribe, it may provide a uniform location estimation service irrespective of whether it subscribes to any communication service provider.

Further, since the base station information (or the patch data) may be configured based on information received through crowdsourcing from a plurality of electronic devices, the electronic device may increase reliability of the base station (or the patch data) and may update the base station (or the patch data) in real time.

In addition, according to various embodiments, the electronic device may provide various effects directly or indirectly ascertained through the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device, comprising:
    a memory;
    a communication circuit; and
    a processor configured to operatively connect with the memory and the communication circuit,
    wherein the processor is configured to:
        send identification information of a base station attached to the electronic device via the communication circuit to a server;
        receive first base station information about base stations included in a first area on the base station from the server;
        store the first base station information in the memory; and
        estimate a location of the electronic device based on properties of a signal received from at least one of the base stations included in the first area and the first base station information, wherein the first base station information comprises location information of each of the base stations included in the first area and coverage information of the base stations included in the first area.

2. The electronic device of claim 1, wherein the coverage information comprises location information in which one or more of signals transmitted from the base stations included in the first area are detected.

3. The electronic device of claim 1, wherein the processor is configured to:
    select the base station to apply triangulation among at least one base station based on the properties of the signal received from the at least one of the base stations; and
    estimate the location of the electronic device by applying the triangulation to location information of the selected base station.

4. The electronic device of claim 3, wherein the processor is configured to correct the location estimated based on the triangulation using the location information estimated based on the coverage information.

5. The electronic device of claim 1, wherein the processor is configured to:
    identify identification information of at least one base station from the properties of the signal received from the at least one of the base stations; and
    estimate the location of the electronic device with reference to the coverage information using the identified identification information as a key.

6. The electronic device of claim 1, wherein the processor is configured to receive second base station information about the base stations included in a second area neighboring to the first area from the server, if the estimated location reaches a boundary of the first area.

7. The electronic device of claim 6, wherein the second area is determined in a size based on a speed of the electronic device.

8. The electronic device of claim 7, wherein the speed of the electronic device is derived from the estimated location and time information at the estimated location.

9. The electronic device of claim 1, wherein the processor is configured to:
send identification information of another base station to the server, if the base station attached to the electronic device is handed over to the other base station; and
receive third base station information about base stations included in a third area on the other base station from the server.

10. A method for estimating a location of an electronic device, the method comprising:
sending identification information of a base station attached to the electronic device to a server;
receiving first base station information about base stations included in a first area on the base station from the server;
storing the first base station information in a memory; and
estimating a location of the electronic device based on properties of a signal received from at least one of the base stations included in the first area and the first base station information, wherein the first base station information comprises location information of each of the base stations included in the first area and coverage information of the base stations included in the first area.

11. The method of claim 10, further comprising:
selecting the base station to apply triangulation among at least one base station based on the properties of the signal received from the at least one of the base stations; and
estimating the location of the electronic device by applying the triangulation to location information of the selected base station.

12. The method of claim 10, further comprising:
identifying identification information of at least one base station from the properties of the signal received from the at least one of the base stations; and
estimating the location of the electronic device with reference to the coverage information using the identified identification information as a key.

13. The method of claim 10, further comprising receiving second base station information about the base stations included in a second area neighboring to the first area from the server, if the estimated location reaches a boundary of the first area.

* * * * *